United States Patent [19]

Hamamoto et al.

[11] Patent Number: 5,412,719
[45] Date of Patent: May 2, 1995

[54] RADIO PAGING SYSTEM WITH VOICE TRANSFER FUNCTION AND RADIO PAGER

[75] Inventors: Nobuo Hamamoto, Hinode; Tadashi Onishi, Hachioji; Tatsundo Suzuki, Musashimurayama; Minoru Nagata, Kodaira; Kenichi Mizuishi, Hachioji; Yosuke Tyojamori, Hino, all of Japan

[73] Assignee: Hitachi, Ltd., Tokyo, Japan

[21] Appl. No.: 5,315

[22] Filed: Jan. 15, 1993

[30] Foreign Application Priority Data

Jan. 17, 1992 [JP] Japan ............... 4-006540
Feb. 28, 1992 [JP] Japan ............... 4-042863

[51] Int. Cl.⁶ ............................................. H04K 1/00
[52] U.S. Cl. ........................................ 380/9; 380/49; 380/50; 340/825.44
[58] Field of Search ............. 380/9, 36, 37, 41, 42, 380/49, 50, 52, 53; 340/825.44, 311.1

[56] References Cited

U.S. PATENT DOCUMENTS

| | | | |
|---|---|---|---|
| 4,701,943 | 10/1987 | Davis et al. | 379/57 |
| 4,873,520 | 10/1989 | Fisch et al. | 340/825.44 |
| 4,885,577 | 12/1989 | Nelson | 340/825.44 |
| 4,937,867 | 6/1990 | Kasparian et al. | 380/9 X |
| 5,159,713 | 10/1992 | Gaskill et al. | 340/825.44 X |
| 5,199,074 | 3/1993 | Thor | 380/50 |
| 5,283,832 | 2/1994 | Lockhaart, Jr. et al. | 380/49 |
| 5,285,496 | 2/1994 | Frank et al. | 380/9 |
| 5,309,154 | 5/1994 | Mun et al. | 340/825.44 |

FOREIGN PATENT DOCUMENTS

| | | | |
|---|---|---|---|
| 61-015429 | 1/1986 | Japan . | |
| 1-196935 | 8/1989 | Japan . | |
| 404127725 | 4/1992 | Japan | 380/9 |
| 518658 | 1/1972 | Switzerland . | |
| 2155676 | 9/1985 | United Kingdom | 340/825.44 |

*Primary Examiner*—Tod R. Swann
*Attorney, Agent, or Firm*—Antonelli, Terry, Stout & Kraus

[57] ABSTRACT

A radio paging system with voice transfer function for transmitting a voice message input from an ordinary push-button telephone set to a small-sized receive-only unsophisticated radio pager. A paging station is provided to transmit by radio the message from a telephone network to the radio pager as follows: voice information constituting the message is first converted from analog to digital format, compressed, stored in memory, and scrambled by a privacy function part for transmission. The radio pager in turn demodulates the received information, stores it in memory, retrieves a necessary message therefrom as designated, descrambles the designated message from scrambled state, expands the message from compressed state, and outputs the message as an audible output. In this manner, the user carrying the radio pager is able to get the message from the caller without the risk of being tapped by a third party.

18 Claims, 21 Drawing Sheets

RADIO PAGING SYSTEM WITH VOICE TRANSFER FUNCTION AND RADIO PAGER

BACKGROUND OF THE INVENTION

1. Field of the Invention

The present invention relates to a radio paging system with voice transfer function and a radio pager for use therewith. More particularly, the invention relates to a unidirectional voice message transmission system comprising a paging station and a receive-only radio pager, the system allowing the radio pager carried by a subscriber to receive not only paging calls but also voice messages coming from the paging station.

2. Description of the Prior Art

Conventional radio paging systems transmit paging calls to a subscriber carrying a radio pager by causing the pager to emit sound, intermittent light or vibration in response to signals sent via telephone and radio networks. Recently developed paging systems send to the radio pager not only paging calls but also predetermined messages containing numbers, symbols and kanji characters for display on the pager's screen. These systems are used not only on public telephone networks but also on private telephone networks installed in hospitals, hotels, department stores and senior citizens' homes.

Japanese Patent Laid-Open No. HEI/3-60227 discloses a voice message transmission system which, when a voice message signal is input via a telephone network, causes a paging station to convert the signal from analog to digital format. After conversion, the digital signal is stored and then forwarded via a radio network to a destination radio pager. In turn, the addressed radio pager stores the received digital signal in its message storage and then converts the signal back to analog format for voice playback.

In connection with the above voice message transmission system, no disclosure is made as to how to transmit large amounts of data within the technical and regulatory constraints of the current networks. For example, if a voice message is sampled in 8 bits at 8 kHz, the amount of data is as high as 64 kilobits per second. Of today's typical paging systems, those pursuant to the NTT specifications involve a channel separation of 12.5 kHz and a maximum frequency deviation of ±2.5 kHz; the systems complying with the POCSAG or Golay specifications require double the bandwidth of the NTT-compatible systems. It follows that transmitting 64 kilobits/sec. data illustratively at the transfer rate (400/sec.) of the conventional NTT-compatible transmission lines would take about 54 seconds. The process is too time-consuming for necessary voice information to be transmitted in practice.

In today's highly information-oriented society, there will be increasing occasions on which it is desired to keep transmitted messages from getting tapped by strangers. In such cases, a privacy function for tapping prevention is mandatory. At present, prior art voice message transmission systems have no such function.

Prior art systems have further disadvantages. On a typical radio pager capable of storing both character and voice information, the subscriber carrying the pager generally performs necessary operations thereon to get the character and/or voice information reproduced for display on the pager's screen or for voice playback. In that case, whether the transmitted message is a mixture of both character and voice information or contains either only, the addressee has no means of knowing the whole stored message until the entire series of operations is carried out to read the number from the display or hear the reproduced voice information from the pager's speaker. Although the presence of character information is seen simply at a glance on the pager display, the presence of a voice message is known only if a playback operation is performed. During voice playback, the message may be so long that the addressee may become irritated, not knowing when it will end.

In addition, the radio pager is required to consume as low power as possible so that the battery incorporated therein will be replaced at the longest possible intervals. This is not always the case with prior art systems.

SUMMARY OF THE INVENTION

It is therefore an object of the present invention to provide a radio paging system with voice transfer function which complies with the current radio paging system specifications and which allows an existing push-button telephone set to input a voice message to a radio pager connected with the system.

It is another object of the invention to provide a radio paging system with voice transfer function capable of efficiently transmitting voice messages over the currently established narrow band for radio paging purposes.

It is a further object of the invention to provide a radio paging system with voice transfer function including a privacy function that prevents transmitted messages from being tapped by strangers.

It is an even further object of the invention to provide a radio paging system with voice transfer function in combination with a pocketable, user-friendly radio pager offering diverse playback functions while operating on low power, the pager allowing the addressee to know quickly the kind of received information and the amount of received voice information.

In achieving the foregoing and other objects of the present invention and according to one aspect thereof, there is provided a radio paging system with voice transfer function having a paging station and a radio pager. The paging station comprises an analog-to-digital converter for converting to digital format a voice signal input via a network interface from a telephone network; first memory means for temporarily storing the data obtained by converting the voice signal to digital format; a privacy function part for scrambling the data from the first memory means; a transmission part for modulating the scrambled data for transmission via a radio network to the radio pager to which the transmitted data is addressed; and a memory part for temporarily storing the identification number unique to the radio pager. In a preferred structure of the paging station according to the invention, there is provided between the analog-to-digital converter and the first memory means a data compression part which reduces the voice information content of the data output by the analog-to-digital converter and which narrows the transmission band of the data.

The radio pager comprises a demodulation part for receiving and demodulating the signal transmitted via the radio network; second memory means for storing consecutively the data from the demodulation part; a privacy cancellation part for descrambling the scrambled data; a digital-to-analog converter for converting the descrambled digital voice signal to analog format; a voice output part for converting the analog signal to a voice signal; a receipt notification part for notifying a user carrying the radio pager of the receipt of information; an operation part for designating playback mode in which the user reproduces the received information in response to the notice made by the receipt notification part; and a signal processor for controlling the component parts of the radio pager.

The playback mode includes at least one of such functions as repeated playback of a voice message, indexing to the beginning of the message for playback, and time compression or expansion playback whereby the message is reproduced over a longer or shorter period of time than was actually spoken by a caller. When containing the data compression part, the paging station also includes a data expansion part for restoring the compressed data to the original time frame.

The paging station may communicate with the radio pager using either digital or analog signals. Where an analog signal is used for transmission of information to the radio pager, the paging station additionally comprises a digital-to-analog converter upstream of the modulation part; the radio pager further includes an analog-to-digital converter that digitizes the demodulated signal so as to store the message data into third memory means. In a preferred structure of the radio pager according to the invention, the pager further comprises checking means for checking the voice information content of the received signal and display means for displaying the voice information content. The checking means includes a function for acquiring, where voice information is found to have been transmitted, the amount of the voice information stored in the memory means. The display means displays the presence or absence of voice information and the amount of voice information if it is present by use of easily identifiable symbols, colors and/or graphic indications. It should be noted that these indications are examples and not limitative of the display means.

When transmitted information contains characters, numerals and/or symbols in addition to voice information, the display means identifies and indicates the type of the received information. Although indications may be given in any form, it is preferable to display the type of the received information using characters, colors or symbols for instantaneous recognition. The checking means for checking the amount of voice information, the means for identifying the type of the received information and the means for driving the display means may each be practiced as a dedicated device. Alternatively, these means may be implemented as part of the functionality of a microprocessor that doubles as the demodulator of the radio pager.

The radio pager according to the invention has its display unit display a character or symbolic indication notifying its user of the storage of voice information into its memory means. When the user of the radio pager (i.e., addressee) knows the absence of voice information in a message upon receipt thereof, the user need not operate the device in vain for voice playback. Furthermore, because the user is able to know in advance the amount of the stored voice information, the user is spared from the irritation formerly experienced in not knowing when the currently reproduced long message would end. With the length of the received message grasped beforehand, the user may plan the next action to take in a timely manner. This eliminates the waste of time that can result from the haphazard playback of an unexpectedly long message. The reproduction circuit of the radio pager when operated does not function if no voice information has been received. This removes the wasteful power dissipation due to the useless activation of the circuit, contributing to the more economical use of the internal battery. In this manner, the service life of the battery contained in the radio pager is substantially prolonged.

These and other objects, features and advantages of the invention will become more apparent upon a reading of the following description with reference to the appended drawings.

DESCRIPTION OF THE PREFERRED EMBODIMENTS

Figure 1:
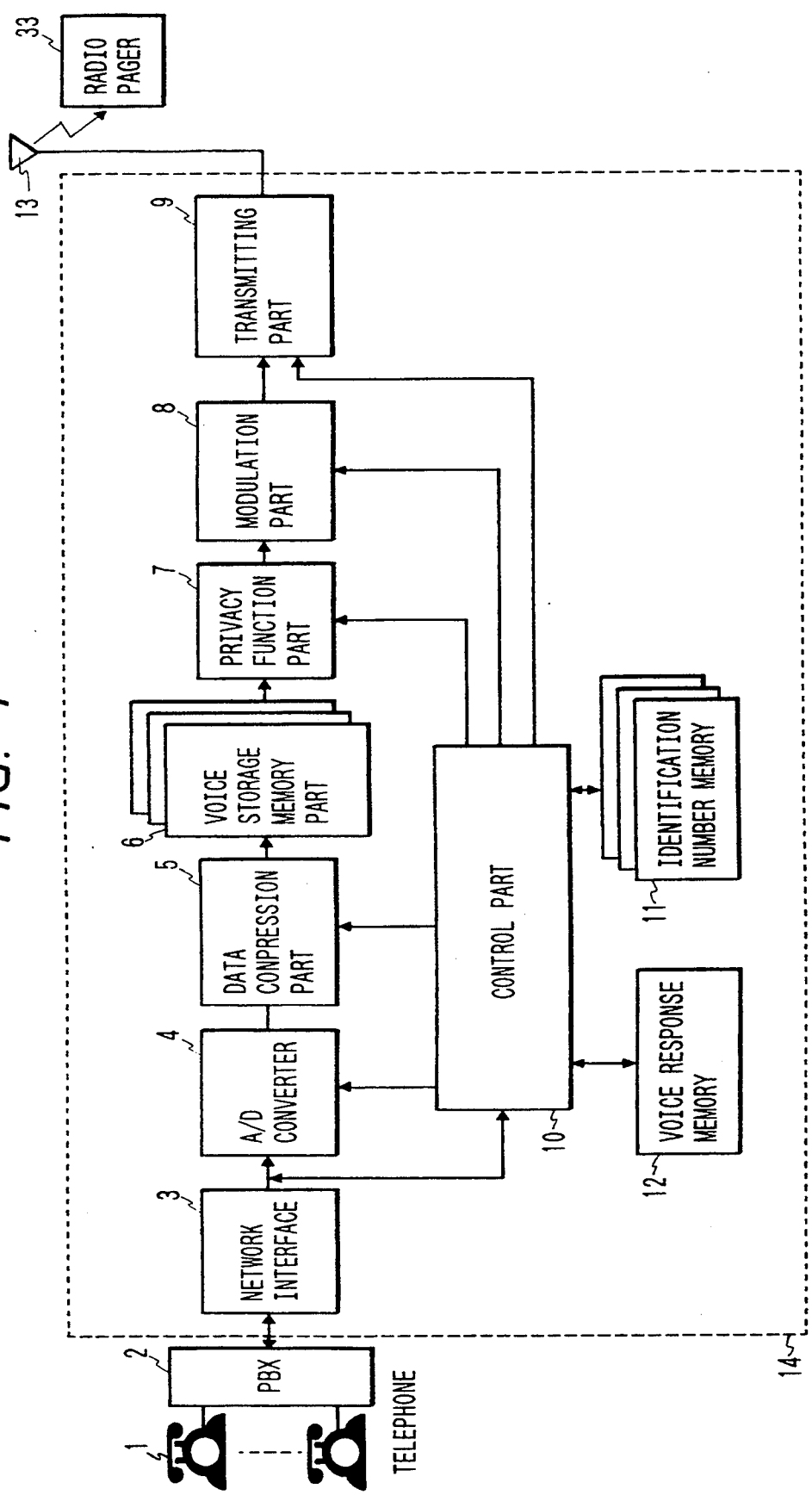
FIG. 1 is a block diagram of a radio paging system with voice transfer function practiced as a first embodiment of the invention.

FIG. 1 is a block diagram of a radio paging system with voice transfer function practiced as the first embodiment of the invention. Although the first embodiment is shown to be connected with a private telephone network, this is not limitative of the invention; the radio paging system may alternatively be connected to a public telephone network.

Using a push-button telephone set 1 of the private telephone network, a caller transmits a voice message to a radio pager carried by an addressee. A paging station 14 is connected to the telephone network via a private branch exchange (PBX) 2. A network interface 3 interfaces the telephone network to the paging station 14. An A/D converter 4 converts the analog voice signal to digital format. A data compression part 5 compresses the digital data. A voice memory part 6 stores temporarily the (voice) message in the form of compressed data. A privacy function part 7 scrambles the data so that when the data is transmitted on a radio signal, it will not be tapped by strangers. A modulation part 8 modulates the data on an FSK (frequency shift keying) basis. A transmission part 9 transmits the signal after power amplification by radio via an antenna 13.

An identification number memory 11 stores temporarily the identification number of the addressee. A voice response memory 12 contains in digital format words and phrases advising the caller by voice how to operate.

In the constitution of FIG. 1, the data compression part 5 is located interposingly between the A/D converter 4 and the voice memory part 6. Alternatively, the data compression part 5 may be disposed between the voice memory part 6 and the privacy function part 7. The processing of the data compression part 5 and that of the privacy function part 7 may be executed by a control part 10 (i.e., microprocessor) on a software basis.

Figure 2:
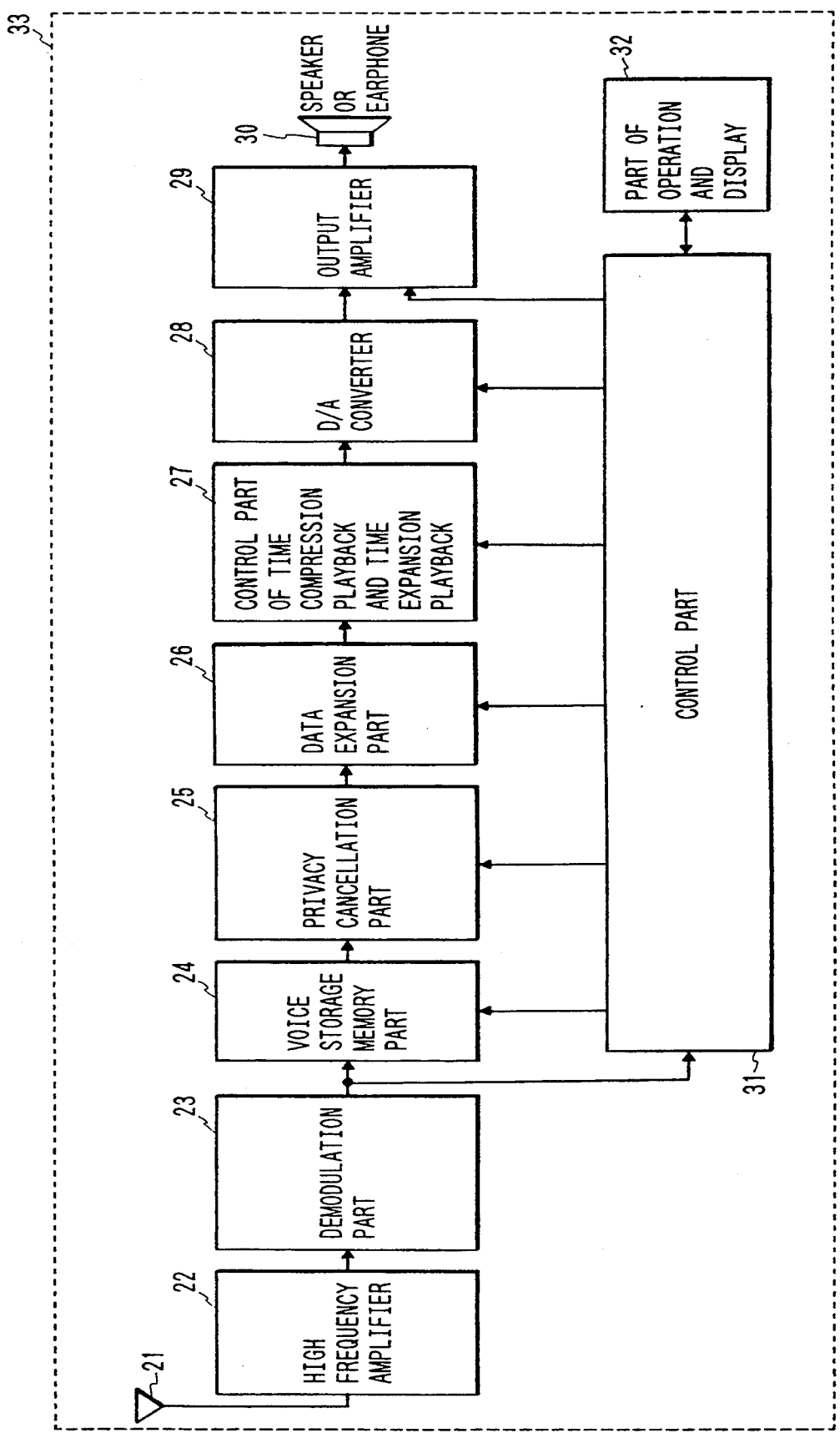
FIG. 2 is a block diagram of an example of a radio pager used by the first embodiment of FIG. 1.

FIG. 2 is a partial block diagram of an example of a radio pager 33 according to the invention. An antenna 21 captures radio waves transmitted. A high-frequency amplifier 22 amplifies the radio signal fed from the antenna 21. A demodulation part 23 detects and demodulates the FSK-modulated signal. A voice memory part 24 stores the received data only if the pager identification number contained in the data coincides with its own identification number. A privacy cancellation part descrambles the scrambled data. A data expansion part 26 reverts the time-compressed data back to the original time frame. A time compression and expansion control part 27 detects voiceless periods (i.e., breaks between words) and removes or elongates these periods in time. A D/A converter 28 eliminates unnecessary frequency components and converts the digital signal to an analog signal. An output amplifier 29 amplifies the analog signal for reproduction through a speaker or earphone 30. An operation and display part 32 comprises a display and switches. The display includes indicators giving such indications as a received message count, memory file numbers, receipt of a message, and the pager location relative to the service area. The switches when operated effect such functions as reproduction, repeat, message protect and erasure. A control part 31 is composed of a microprocessor that supervises the whole range of operations of the radio pager 33. The operations under microprocessor control include detection of a synchronizing signal, determination of whether or not the call is addressed to this radio pager, generation of a reception end acknowledge signal (message receipt signal) alerting the addressee carrying the radio pager to the receipt of a message, correction of error in the received data, and input/output operations to and from the operation and display part 32.

The processing of the privacy cancellation part 25, that of the data expansion part 26 and that of the time compression and expansion control part 27 may be implemented on a software basis by the microprocessor of the control part 31. The radio pager is fully functional with or without the time compression and expansion control part 27. Referring to FIG. 2, the radio pager 33 may have a memory, not shown, for storing time-expanded voice data, located interposingly between the data expansion part 26 and the data compression and expansion control part 27; this additional memory if provided is used for voice data reproduction. A benefit of this arrangement is that there is no need to perform time expansion in real time. In this arrangement, the processing of the time compression and expansion control part 27 may also be implemented by the microprocessor of the control part 31 using software. The time compression and expansion control part 27 may also be removed without hampering the full functionality of the radio pager.

The voice memory part 6 in the paging station 14 and the voice memory part 24 and the memory for storing time-expanded voice data in the radio pager are so-called RAM's (random access memories). These memories are usually SRAM's, pseudo SRAM's, DRAM's or flash memories. Other kinds of RAM's may also be utilized for the memories.

Figure 3:
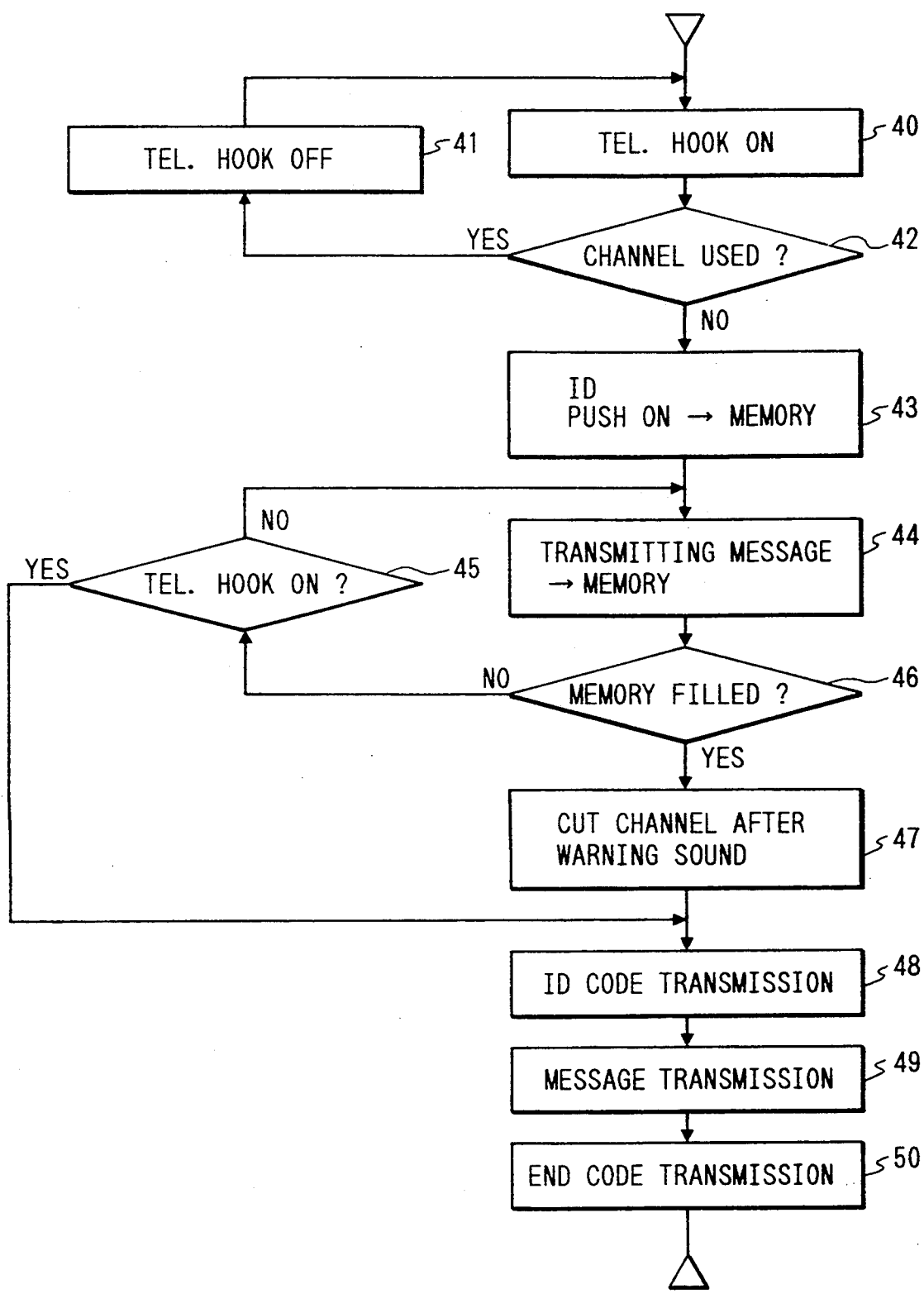
FIG. 3 is a flowchart of steps taken by a paging station 14 shown in FIG. 1.

FIG. 3 is a flowchart of steps taken by the paging station 14. In step 40, the caller picks up the handset of a nearby telephone set 1 of the private network and inputs using buttons the private network number assigned to the paging station 14 to call up that station. In step 42, a check is made to see if the circuit to the paging station 14 is busy. If the circuit is busy, the caller replaces the handset for the moment in step 41 and again calls the paging station 14. If the circuit to the paging station 14 is connected, the voice response memory 12 of the paging station 14 is accessed and a message is retrieved therefrom which says, "This is the - - - paging station. Please enter the identification number of the radio pager (33)." In response to this voice guidance, the caller enters the identification number assigned to the destination radio pager 33 by pushing appropriate buttons of the telephone set. The paging station 14 returns a voice message saying, illustratively, "The number has been confirmed. Please put in your message after the beep."

At this point, the control part 10 of the paging station 14 checks to see if the number entered by the caller is valid. If an unregistered number is entered inadvertently, an alert message is transmitted asking the caller to input the correct number. The identification number verified as valid is stored into the identification number memory 11 (step 43). After hearing the beep sound, the caller dictates a desired voice message (illustratively on a 5 kHz band) and replaces the handset.

The maximum period of time (or maximum amount of data) for a single message call is determined primarily by the traffic carrying capacity of the telephone network. It is illustratively agreed in advance that the maximum time for each call is, say, 30 seconds; that the currently entered message is truncated when the voice memory part 6 becomes full; or that the call is terminated when a predetermined continuous voiceless period has elapsed. In any of these agreed-on cases, the paging station 14 issues a message stating the refusal of any further message entry and disconnects the circuit.

The voice message entered is converted to digital format by the A/D converter 4 and stored in the voice memory part 6 (steps 44, 46, 45, 47). For example, sampling a message in 8 bits at 8 kHz requires 46 kilobits per second as the amount of data involved. After the data is compressed with the transfer capacity and transfer rate taken into account, the data is stored and scrambled inside the paging station 14. Thereafter, a synchronizing signal and the identification number are transmitted according to the transmission protocol of the paging station 14 (step 48). With the voice memory part 6 being accessed, the scrambled message is transmitted successively (step 49). When the end of the data is reached, an end code is transmitted and the processing of the paging station 14 comes to an end (step 50).

Figure 4:
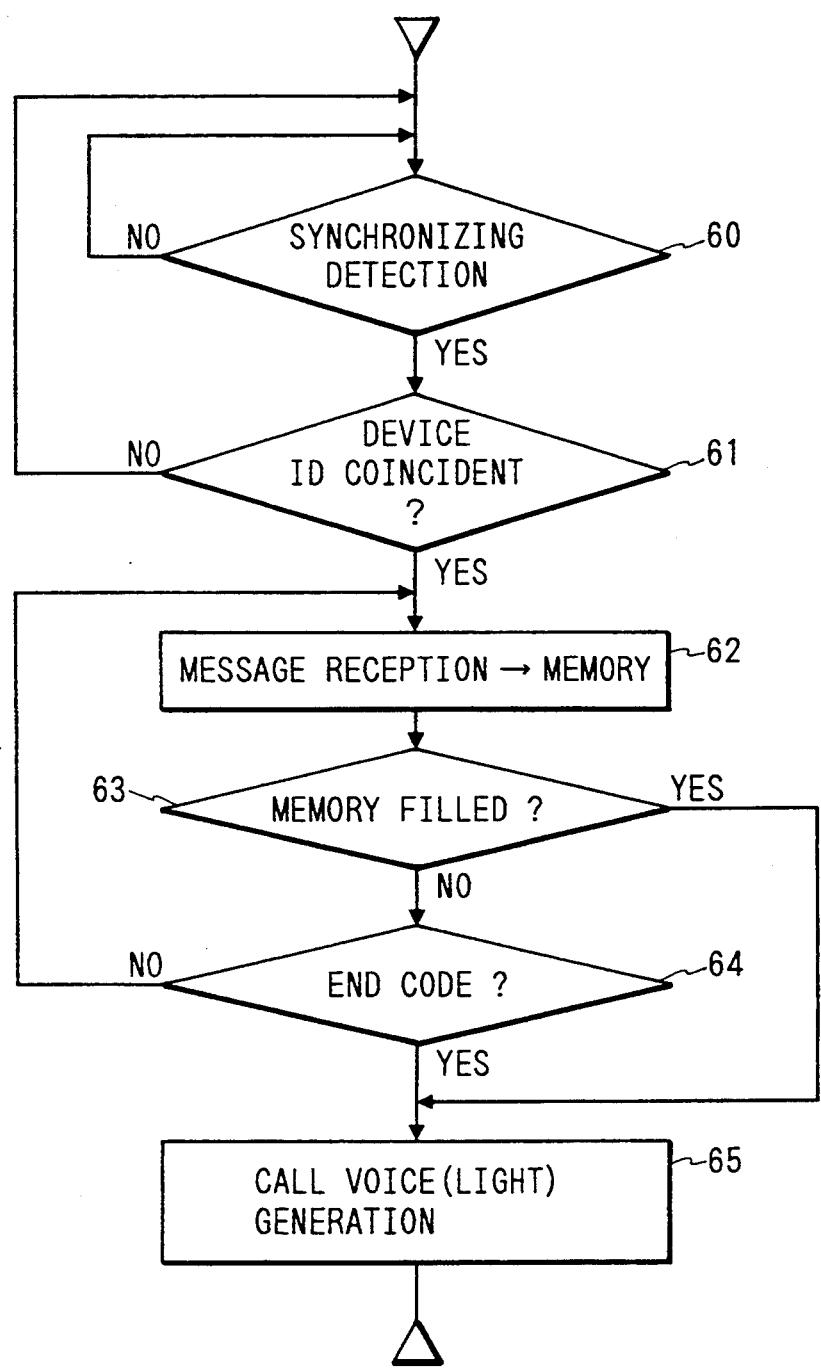
FIG. 4 is a flowchart of steps taken by the radio pager 33 contained in FIG. 2.

FIG. 4 is a flowchart of steps taken by the radio pager 33 shown in FIG. 2. When power is applied, a check is first made to see if the synchronizing signal is present (step 60). With the synchronizing signal detected, the identification number following that signal is received and compared with the own identification number assigned to the radio pager 33. If the comparison results in a mismatch, the radio pager 33 again returns to its initial state and waits for the next synchronizing signal to come in. If the received identification number matches that of the radio pager 33, the radio pager 22 enters a mode in which to receive the message that follows the transmitted identification number (step 61). The data detected and demodulated by the demodulation part 23 is stored successively into the voice memory part 24 (step 62). The data storing operation continues until the voice memory part 24 overflows, until an end code is received, or until a predetermined number of data items have been received (steps 62, 63, 64). Thereafter, the radio pager 33 emits a sound, flashes light or generates a vibration to notify the addressee carrying the pager of the receipt of the message, and then terminates its processing (step 65).

Figure 5:
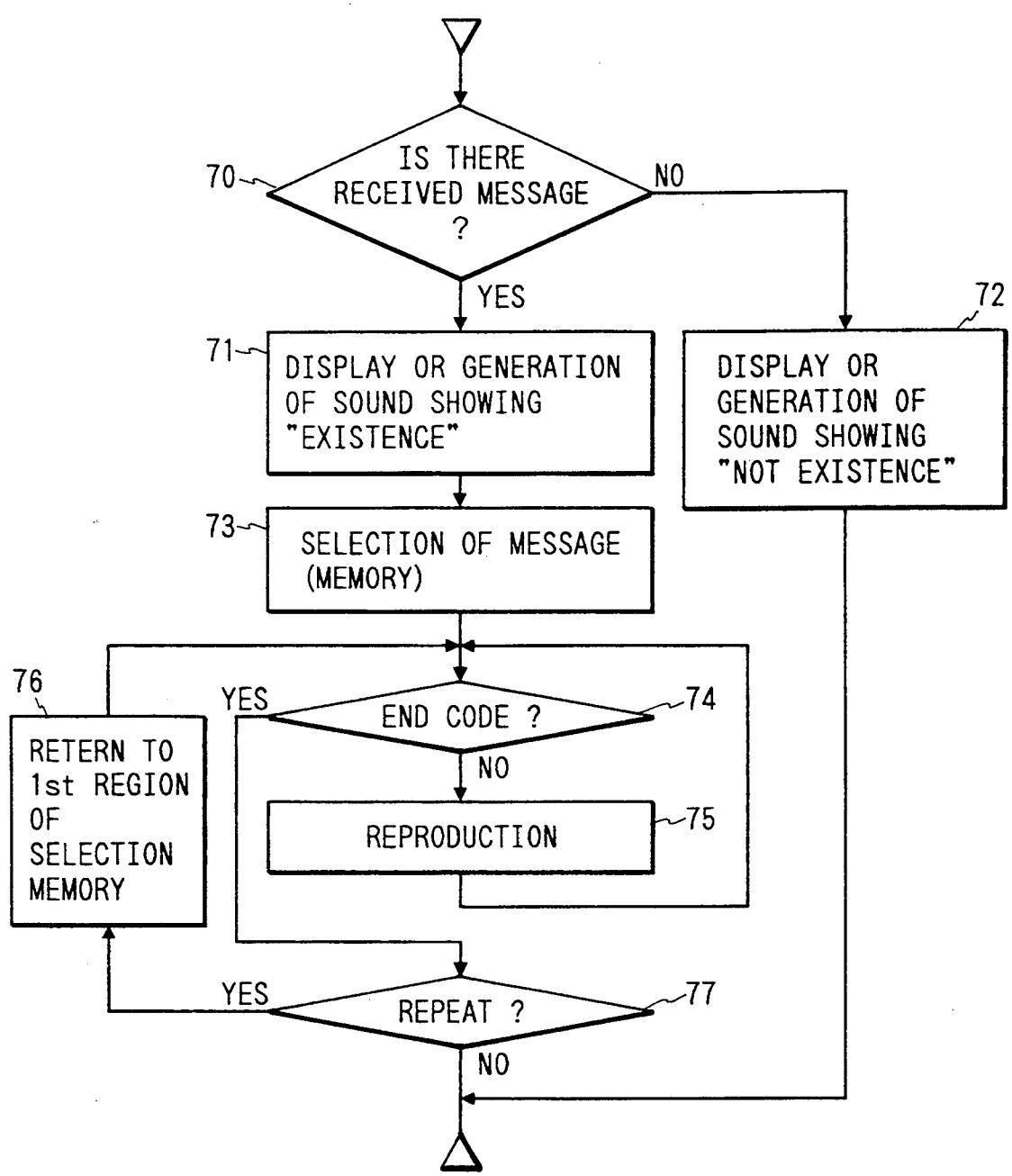
FIG. 5 is a flowchart of information reproduction steps taken by the radio pager 33 of FIG. 2.

FIG. 5 is a flowchart of information reproduction steps taken by the radio pager 33. Pressing the "MODE" switch on the operation and display part 32 (see FIG. 24) to enter reproduction mode initiates an information reproduction process. A check is first made to see if any message has been received (step 70). If no message is found to be stored in the voice memory part 24, a visual indication or sound emission is provided to indicate the absence of messages, and the processing is terminated. If at least one message is found to be stored in the voice memory part 24, a visual indication or sound emission is provided to give the number of messages received (steps 70, 71, 72) before the next step is reached. Which of the received messages is to be reproduced is then selected by pressing the "SELECT" button. Pressing appropriately the "SELECT" button selects the relevant memory bank (step 73). Pushing the "EXECUTE" button starts reproducing the message from the selected memory bank. The end of the message contains an end code which is recognized as soon as the message comes to an end. The data is reproduced while the data retrieved from memory is being checked for an end code. When an end code is reached, the reproduction operation is terminated (steps 74, 75). If it is desired to repeat the reproduction of the same message, pushing again the "EXECUTE" button restarts the reading of the data from the beginning of the memory bank currently selected (steps 77, 76).

Where the maximum length (i.e., time period) of each message is agreed on beforehand with the system, the end code is not needed. That is, the relevant memory bank set to the fixed length is simply read from beginning to end. Where the message length (time) is variable, messages may also be reproduced without the use of end codes. In the latter case, a message transmitted by the paging station 14 transfers to the destination radio pager the information indicating the message length (time) as a parameter. In turn, the radio pager reads its memory pursuant to that parameter, whereby the variable message length reproduction is implemented.

Figure 6:
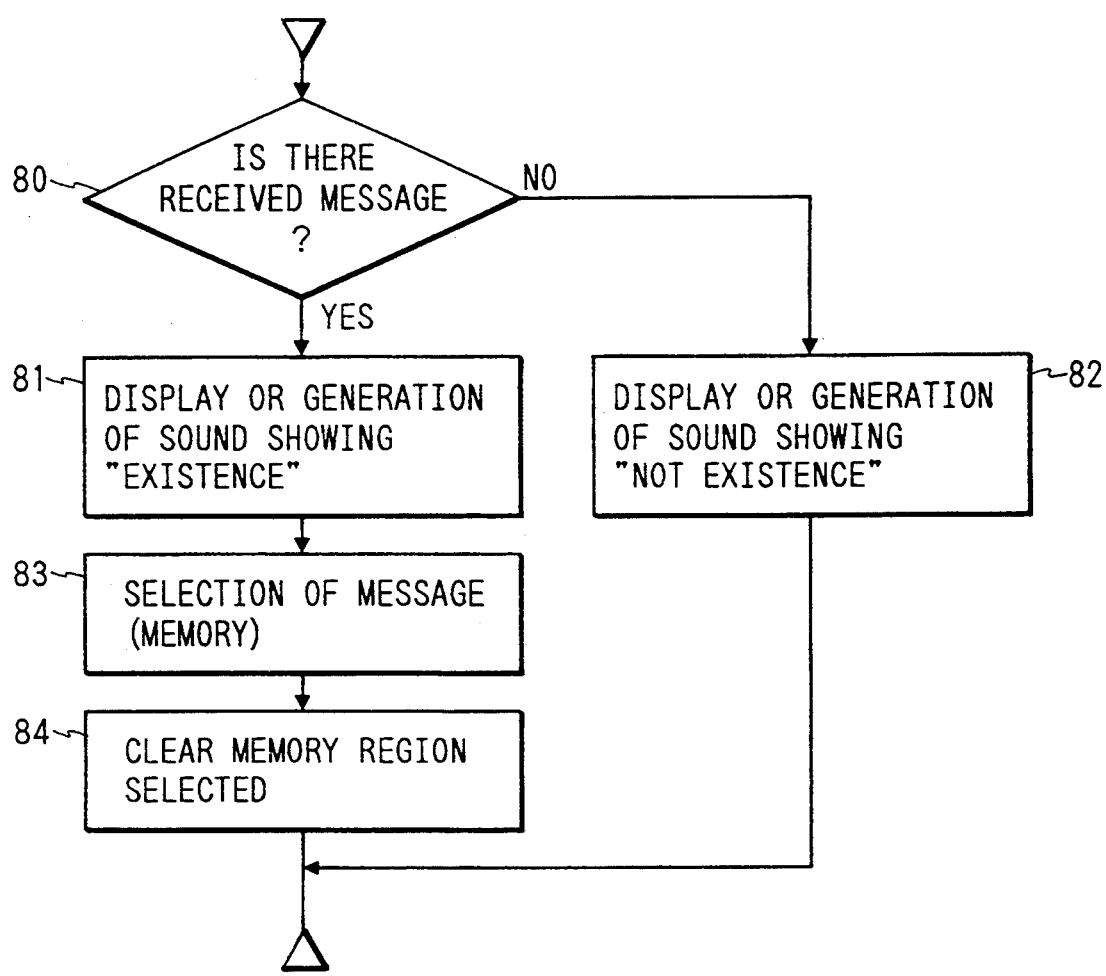
FIG. 6 is a flowchart of erasure steps taken by the radio pager 33 of FIG. 2.

FIG. 6 is a flowchart of erasure steps taken by the radio pager 33. As with the reproduction processing, pushing the "MODE" switch causes the radio pager 33 to enter erasure mode. In step 80, a check is made to see if any message has been received. If no message is found to be stored in the voice memory part 24, a visual indication or sound emission is provided to indicate the absence of messages, and the processing is terminated. If at least one message is found to be stored in the voice memory part 24, a visual indication or sound emission is provided to give the number of messages received (steps 80, 81, 82) before the next step is reached. Which of the received messages is to be erased is then selected by pressing the "SELECT" button. Pressing appropriately the "SELECT" button selects the relevant memory bank (step 83). Pushing the "EXECUTE" button erases the memory bank containing the message (step 84). If it is desired to erase all stored messages, the above series of steps may be repeated as many times as needed.

Figure 7:
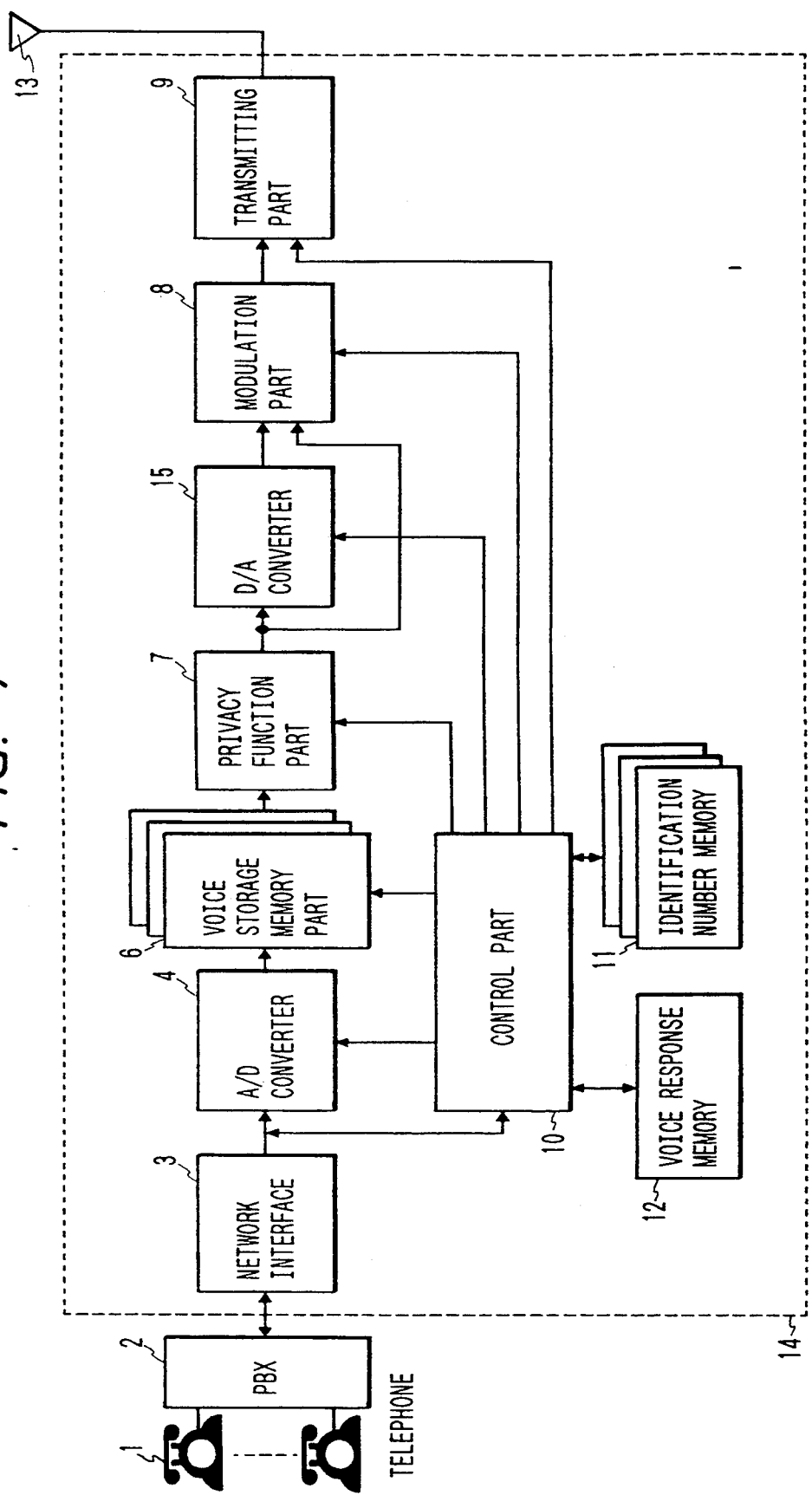
FIG. 7 is a block diagram of a radio paging system with voice transfer function practiced as a second embodiment of the invention.

FIG. 7 is a block diagram of a radio paging system with voice transfer function practiced as the second embodiment of the invention. FIG. 7 does not include any radio pager; it is a partial block diagram of the paging station 14 that transmits message data as an analog signal. As mentioned, the frequency band assigned to radio pagers is fairly narrow. To use that band for transmitting digitized voice data requires selecting one of three options: to speed up modulation and demodulation processing by resorting to novel schemes; to reduce the amount of information down to a level where the transmitted information is minimally intelligible (i.e., to compress data); or to combine suitably these two options.

By contrast, the currently available band of about 10 kHz for analog data transmission allows analog voice signals to be transmitted in real time without recourse to any special measures. In this case, however, the privacy function is mandatory to prevent tapping.

In FIG. 7, the analog voice signal obtained via the network interface 3 is converted to digital format by the A/D converter 4. The digitized data is stored temporarily in the voice memory part 6. In steps similar to those in FIG. 3, data is read consecutively from the voice memory part 6 and is scrambled by the privacy function part 7. The scrambled data is again converted to an analog signal by the D/A converter 15. The analog signal is modulated by the modulation part 8 and amplified by the transmission part 9 for transmission by radio.

Figure 8:
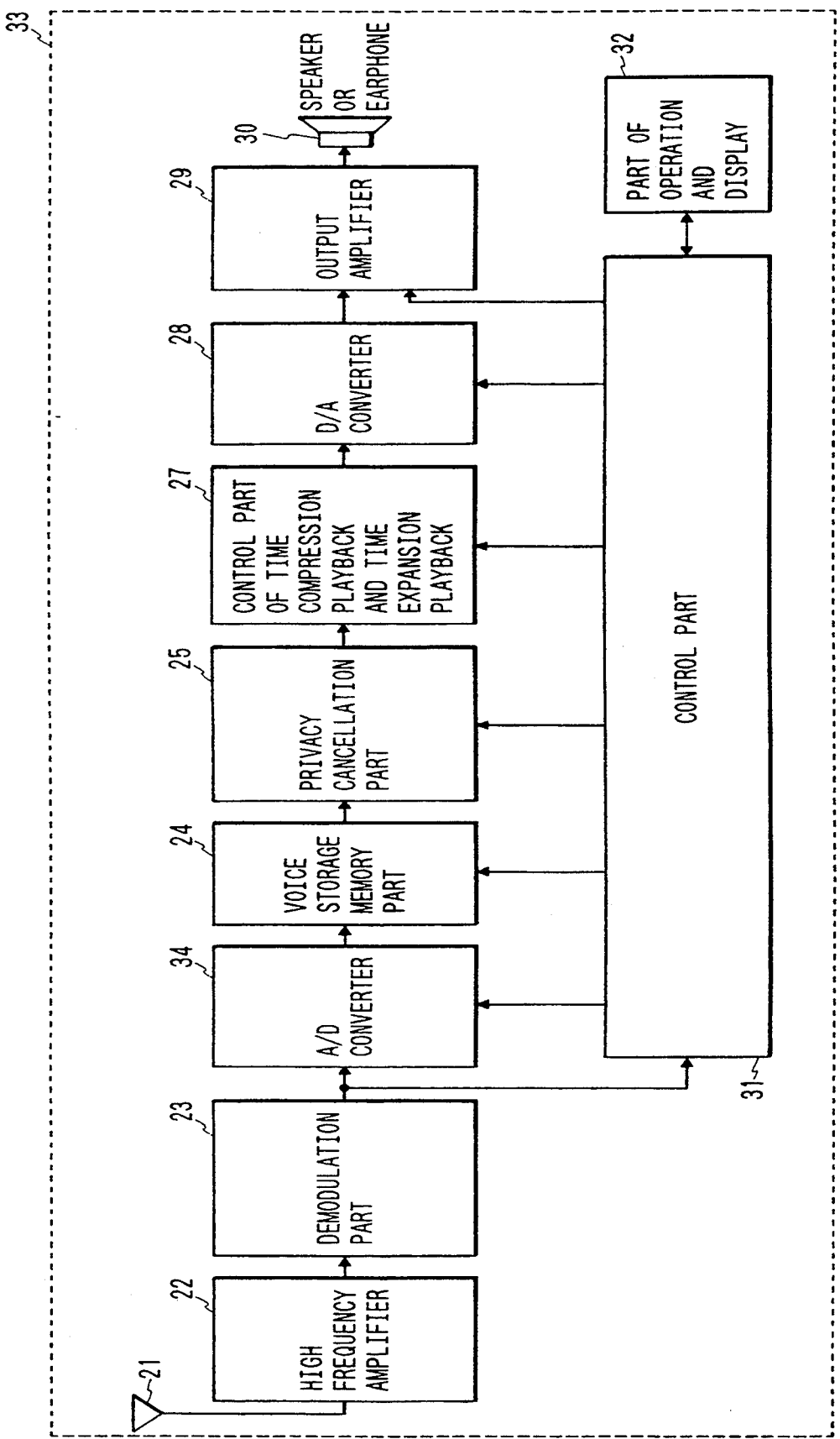
FIG. 8 is a block diagram of a radio pager for use with the second embodiment of FIG. 7.

FIG. 8 is a block diagram of a radio pager for use with the second embodiment of FIG. 7. The basic constitution and operation of this radio pager are the same as those of the radio pager 33 in FIG. 2. The primary difference is that the output of the demodulation part 23 is a scrambled analog signal. This signal is converted to a digital signal by an A/D converter 34. The resulting digital signal is stored in the voice memory part 24. After all messages have been received, the addressee (who carries the radio pager) instructs the machine to reproduce any of the messages. Those relevant memory banks in the voice memory part 24 which correspond to the desired messages are read out consecutively. The scrambled data is descrambled and, via the time compression and expansion control part 27 (not provided if time compression or expansion playback is unnecessary), the data is converted by the D/A converter 28 back to the analog signal which is reproduced by speaker or earphone 30.

The radio paging system with voice transfer function practiced as the second embodiment and depicted in FIGS. 7 and 8 transmits voice information essentially as follows: the read frequency of the voice memory part 6 in the paging station 14 is made at least higher than the conversion frequency of the A/D converter 4. The data read out at that frequency is treated in the same manner as in the paging station 14 of the first embodiment before being transmitted by radio. In the radio pager 33, the conversion frequency of the A/D converter 34 is made to coincide with the read frequency of the voice memory part 6 of the paging station 14. For reproduction, the write frequency of the voice memory part 24, the conversion frequency of the A/D converter 4 in the paging station 14 and the write frequency of the voice memory part 6 also in the paging station 14 are made to coincide with one another. With these arrangements in place, the same reproduction processing as that of the radio pager in the first embodiment is carried out.

Furthermore, the second embodiment depicted in FIGS. 7 and 8 shortens radio communication time essentially as follows: there is disposed a speech time compression part (for shortening the speech time while keeping the voice pitch constant), not shown, interposingly between the voice memory part 6 and privacy function part 7 in the paging station 14. The speech time compression part serves to shorten the time duration of voice pronouncement. In the radio pager 33, there is provided a speech time expansion part (for prolonging the speech time while keeping the voice pitch constant), not shown, interposingly between the privacy cancellation part 25 and the time compression and expansion control part 27. The speech time expansion part prolongs the time of speech pronouncement back to the original time period for reproduction. The speech time compression processing of the paging station 14 and the speech time expansion processing of the radio pager 33 may be implemented by the control part 10 of the paging station 14 and by the microprocessor of the radio pager 33, respectively, through the use of software.

Figure 9:
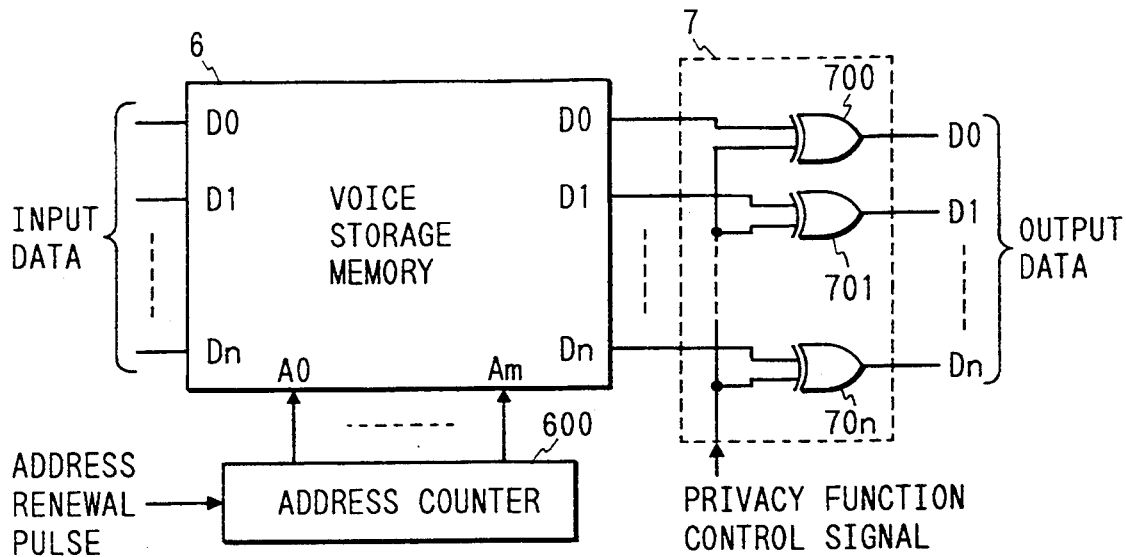
FIG. 9 is a circuit diagram of an example of a privacy function part 7 in the first embodiment of FIG. 1.

FIG. 9 is a circuit diagram of an example of the privacy function part 7 in the first embodiment of FIG. 1. As illustrated, the read data output side of the voice memory part 6 comprises exclusive OR circuits 700 through 70n which are controlled with a privacy function control signal. The exclusive OR circuits 700 through 70n are provided to correspond with all bits of read-out signals D0 through Dn. Alternatively, the exclusive OR circuits 700 through 70n may be provided to correspond with only one or a plurality of bits, including the most significant bit. The input data terminals of the voice memory part 6 receive the digital signal forwarded unchanged from the data compression part 5.

If the voice memory part 6 is a semiconductor memory device whose input and output terminals are made common, the exclusive OR circuits 700 through 70n are inserted in the read-out signal path over a signal bus to which the data terminals of the memory are connected. Digital signals are read from the voice memory part 6 in response to the address signal generated by an address counter 600 that receives address updating pulses. When the privacy function control signal is set to 0, the output signal from the memory part 6 passes through the exclusive OR circuits 700 through 70n non-inverted to become output data D0 through Dn (i.e., not scrambled). When the privacy function control signal is set to 1, all bits of the output signal from the memory part 6, or those bits with respect to which the exclusive OR circuits 700 through 70n are inserted, are inverted before transmission. Any third party catching the transmitted digital signal and converting it back to the analog signal can only obtain unintelligible bits and pieces of sound. In this manner, the privacy of transmitted messages is protected.

Figure 10:
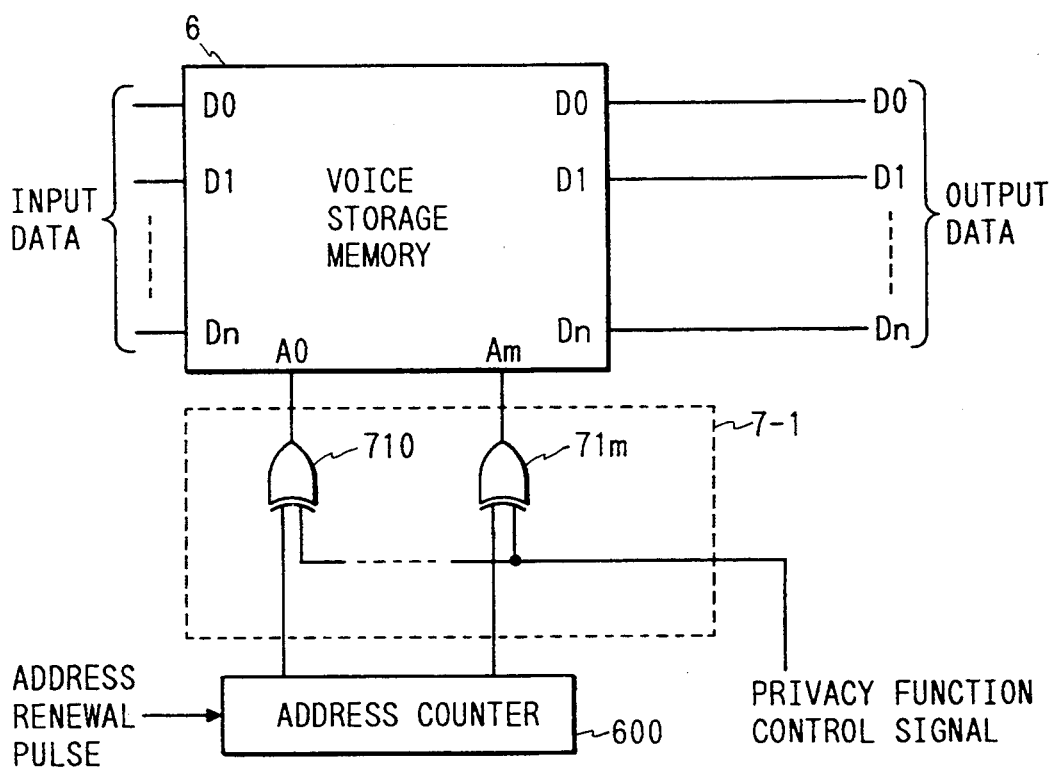
FIG. 10 is a circuit diagram of another example of the privacy function part 7 in the first embodiment of FIG. 1.

FIG. 10 is a circuit diagram of another example of the privacy function part 7 used by the first embodiment of FIG. 1. In this example, a privacy function circuit 7-1 using exclusive OR circuits 710 through 71m is provided on the address input terminal side of the voice memory part 6. In this case, unlike the case in which the addressing of the voice memory part 6 is selected for input, the input to the memory is inverted in one or a plurality of bits. That is, continuous addresses input to the memory are output therefrom in a scattered and discontinuous manner. If the output digital signal were converted to an analog signal by a third party using such discontinuous addresses, the result obtained would be meaningless gibberish. This scheme provides privacy protection just as effective as that of the circuitry in FIG. 9.

Alternatively, the examples of FIGS. 9 and 10 may be combined so that one or a plurality of exclusive OR circuits are used on both the data and the address sides. This arrangement will provide much more effective privacy protection.

Figure 11:
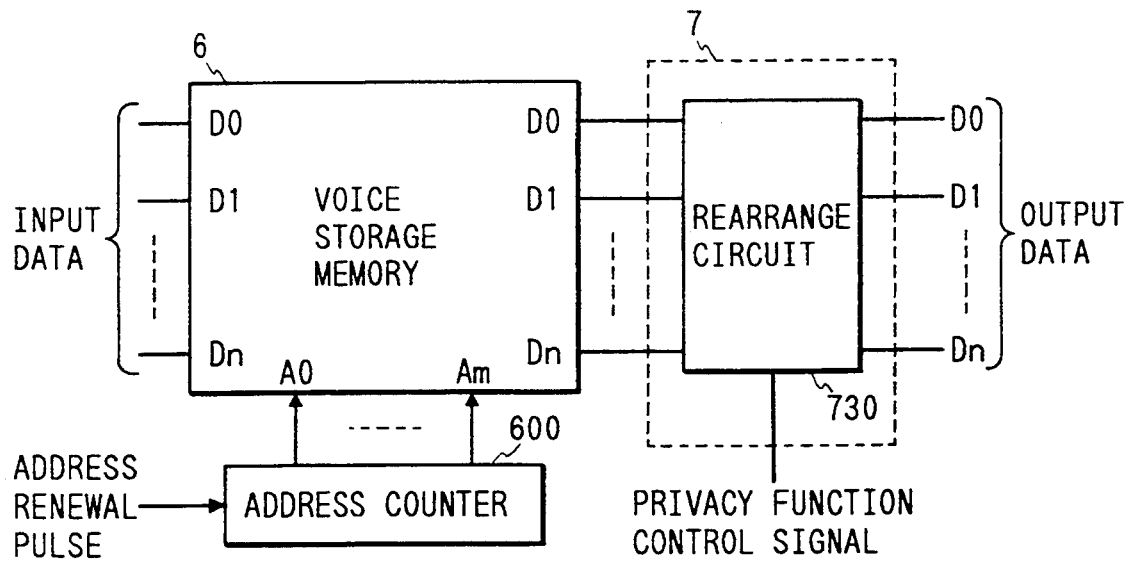
FIG. 11 is a circuit diagram of a further example of the privacy function part 7 in the first embodiment of FIG. 1.

FIG. 11 is a circuit diagram of a further example of the privacy function part 7. In this example, a rearrange circuit 730 replaces the bit non-inverting/inverting arrangements in FIGS. 9 and 10 which are implemented by use of exclusive OR circuits. Illustratively, the rearrange circuit 730 has two signal paths, one allowing the input signal to pass through non-inverted, the other causing input bits D0 through Dn to change their places among them before they are output as rearranged bits D0 through Dn. More specifically, the least significant bit D0 may be output as, say, the most significant bit Dn, and D1 as D2. The random switching of the bit places is updated for each message by use of a random number generator 734 (see FIG. 12). This makes it virtually impossible for any third party to decode the received bit sequence into meaningful data. Because the above scheme breaks the digital signal into incomprehensible bits of data against the tapping by strangers, it provides privacy protection just as effective as that of the above-described privacy function parts.

Figure 12:
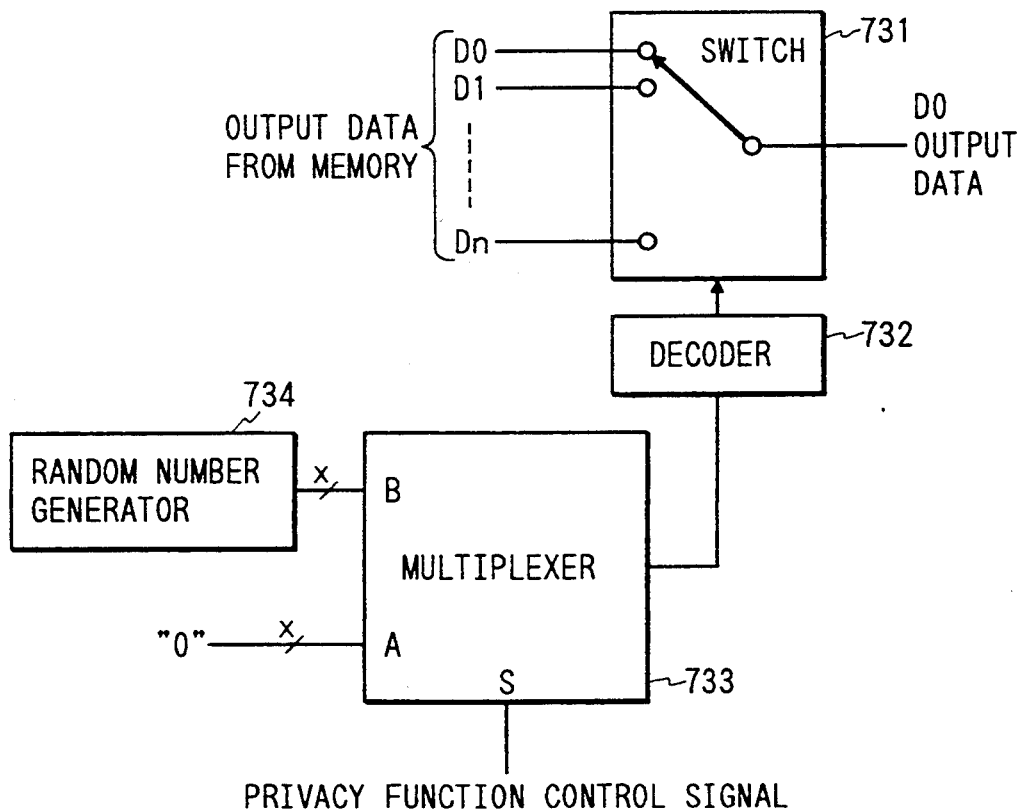
FIG. 12 is a circuit diagram of an example of a rearrange circuit 730 used by the privacy function part 7 in FIG. 11.

FIG. 12 is a circuit diagram of an example of the rearrange circuit 730 used by the privacy function part 7 in FIG. 11. In this example, a one-bit rearrange circuit 731 deals illustratively with a digital signal made of a plurality of bits. One of bits D0 through Dn constituting the input digital signal is selected by the rearrange circuit 731 and output as the least significant bit D0 from the output terminal of the circuit 731. A decoder 732 generates a select signal that causes the rearrange circuit 731 to select one of the bits D0 through Dn for output.

Where the digital signal is composed of eight bits (D0–Dn), the random number generator 734 generates a three-bit random number (0–7 in decimal notation) for input to one of two input terminals B of a multiplexer 733. The other input terminal A of the multiplexer 733 is fed with a three-bit binary signal "000" designating a decimal zero that corresponds to the output bit D0. A privacy function control signal is input to a control terminal S of the multiplexer 733. When the privacy function control signal is set to 1, the privacy function is activated and the bit rearrangement takes place according to the output signal from the random number generator 734. The random number is updated for each transmitted message but is not limited thereby. On the radio pager side, the random number is received as a descrambling parameter (random number code) following the own identification number assigned to the pager. Using the parameter, the radio pager descrambles the message with ease.

The privacy cancellation part 25 in the radio pager 33 has basically the same circuit constitution as that of the privacy function part 7 in the paging station 14. The two privacy function-related parts require no major changes regardless of the message data being digital or analog. The rearrange circuit 731 may be provided on the address side in place of the exclusive OR circuits of FIG. 10.

Figure 13:
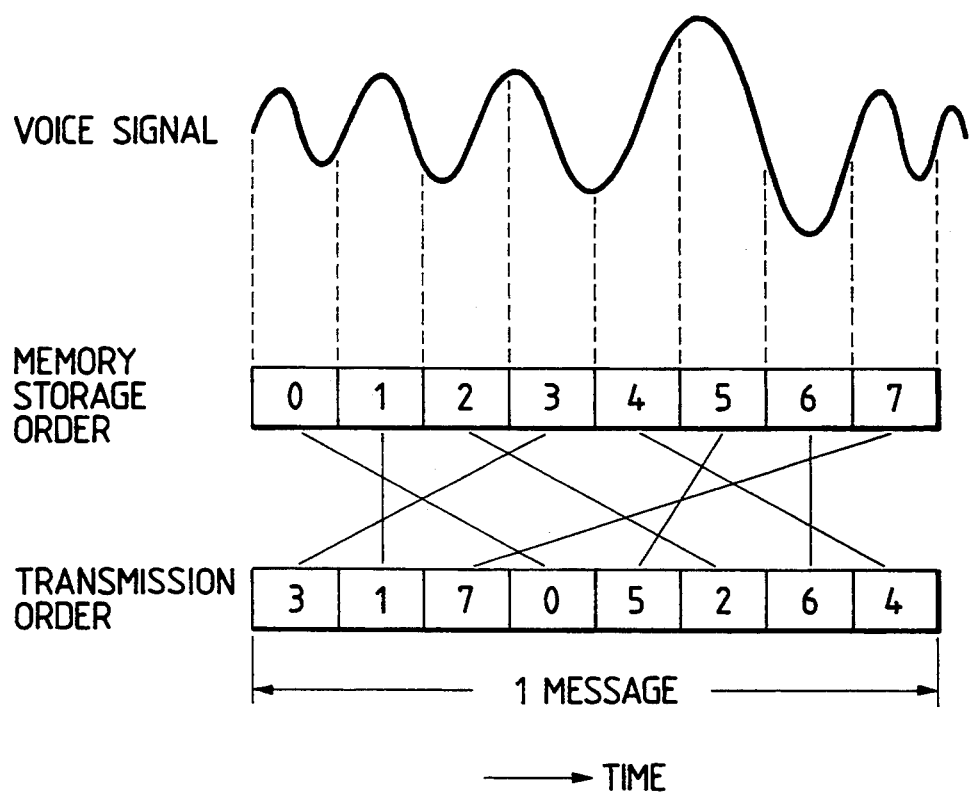
FIG. 13 is a conceptual view showing how the rearrange circuit 730 of FIG. 11 operates.

FIG. 13 illustrates conceptually how data bits are rearranged where the rearrange circuit 731 is provided to address only the upper three significant bits of the address input side. Specifically, a voice signal is sampled and digitized by the A/D converter 4, and the digital data is stored in the voice memory part 6. At this time, the digital data is stored into the memory in a time-sequentially ordered manner. After one message of data is stored, transmission mode is selected. At this point, transmitting the data in the same order in which it was stored would mean completely bypassing the privacy function. Instead, a memory space containing the message is divided into, say, eight banks. As can be seen from FIG. 13, rearranging the banks or inverting the order in which to read the data from the banks activates the privacy function.

However, rearranging the data always in the same order can lead to eventual decoding of messages by an unscrupulous third party. That possibility is minimized when the data rearranging pattern is changed every time a message is transmitted. The privacy function is made virtually immune to tapping by increasing the number of divided banks in the memory in addition to continuously updating the data rearranging pattern.

Figure 14:
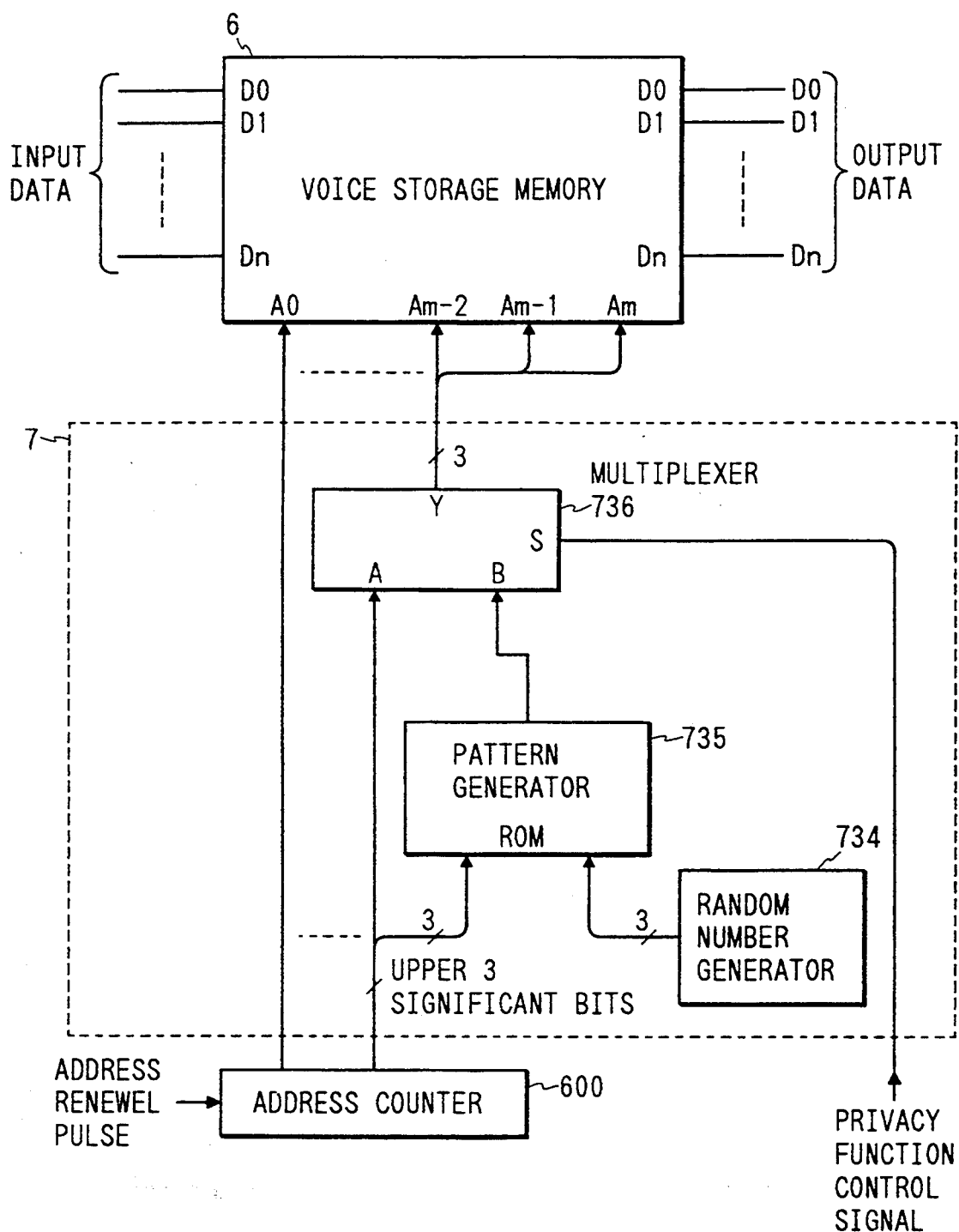
FIG. 14 is a circuit diagram of a privacy function part for implementing the privacy function depicted in FIG. 13.

FIG. 14 is a circuit diagram of a typical privacy function part for implementing the privacy function depicted in FIG. 13. In this example, the one-message memory space is divided into eight banks which are then rearranged. For memory space division, the upper three significant bits alone of the output signal from an address counter 600 are manipulated and the remaining bits of the output signal are added unchanged to the corresponding address inputs of the voice memory part 6. The upper three significant bits of the address counter 600 are added both to the lower three address bits of a pattern generation ROM 735 for rearranging pattern generation and to an input terminal A of a multiplexer 736. The upper three address bits of the pattern generation ROM 735 are connected with the output signal from the random number generator 734. The three output bits of the pattern generation ROM 735 are connected to an input terminal B of the multiplexer 736. The three output bits of the multiplexer 736 are connected to the upper three address bits of the voice memory part 6. A control terminal S of the multiplexer 736 is supplied with the privacy function control signal.

When a caller's message is to be stored into the voice memory part 6, the privacy function control signal is set to 0. This causes the multiplexer 736 to select the input terminal A. That is, the upper three output bits of the address counter 600 are connected logically and unchanged to the upper three address bits of the voice memory part 6. In this manner, the input data is placed into the memory in a time-sequentially ordered manner.

When transmission mode is selected, the privacy function control code is set to 1. This causes the multiplexer 736 to select the input terminal B. Thus the upper three address bits of the voice memory part 6 are fed with the output from the pattern generation ROM 735. It follows that when the data is read from the voice memory part 6, the addresses are not necessarily updated regularly starting from address 0; they may be scattered and discontinuous depending on the output of the pattern generation ROM 735.

Figure 15:
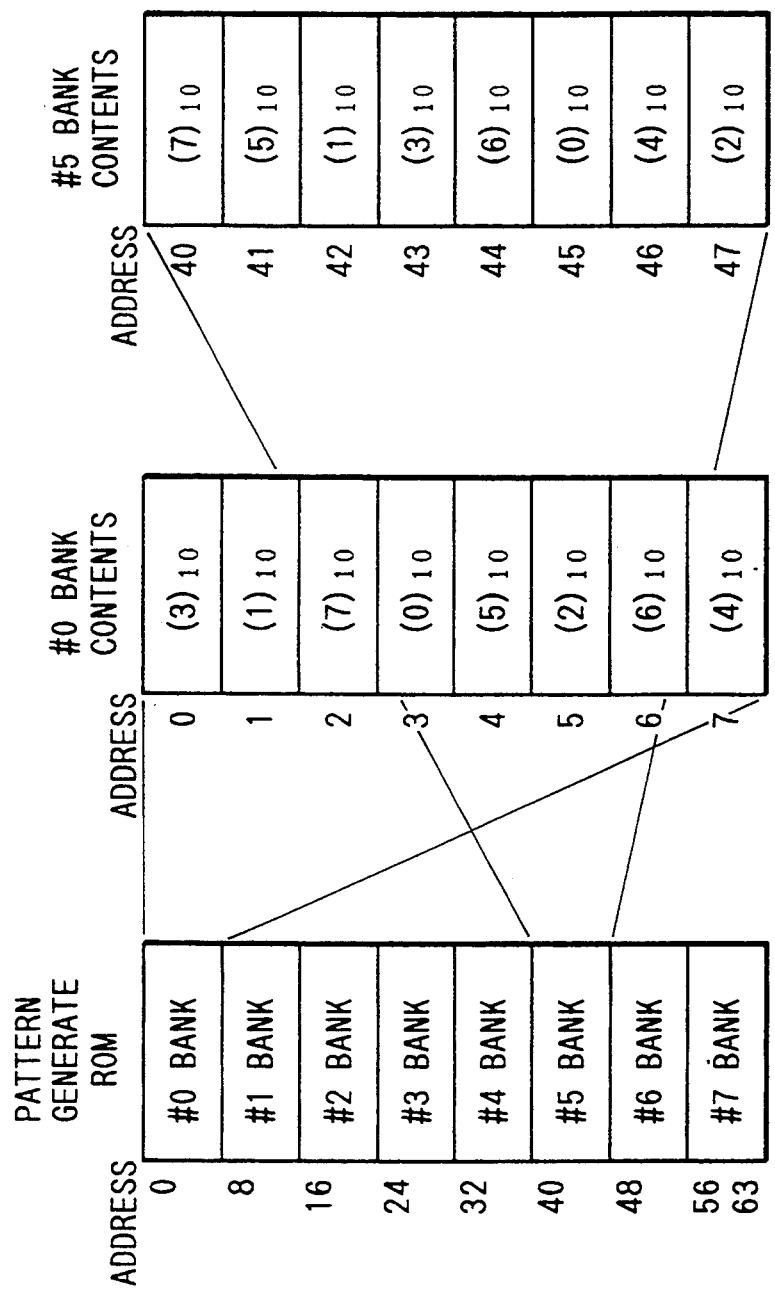
FIG. 15 is a view illustrating typical data stored in a pattern generation ROM used by the privacy function part of FIG. 14.

FIG. 15 depicts typical data stored in the pattern generation ROM 735. As indicated, the address space is divided into eight banks. Which of the banks is to be selected is determined by the output signal from the random number generator 734. For example, an output signal "000" causes a #1 bank to be selected; "101" causes a #5 bank to be selected. FIG. 15 shows the contents of the #0 and #5 banks as an example.

When the #0 bank is selected, the order of data transmission, i.e., the order in which to read data from the voice memory part 6, is established as shown in FIG. 13 wherein the banks are switched as indicated. If the random number generator 734 is updated every time a message has been transmitted, the data transmission order is changed accordingly. As a result, it is extremely difficult for a third party to tap the transmitted messages during activation of the privacy function.

The radio pager 33 is made to register the contents of the pattern generation ROM 735 in the manufacture stage. In operation, the contents of the random number generator are transmitted as a descrambling parameter (privacy function code) along with each message. Upon receipt of the descrambling parameter, the radio pager 33 readily decodes the scrambled message associated with that parameter. The privacy cancellation part 25 is implemented using basically the same circuit constitution as that of the privacy function part 7.

Figure 16:
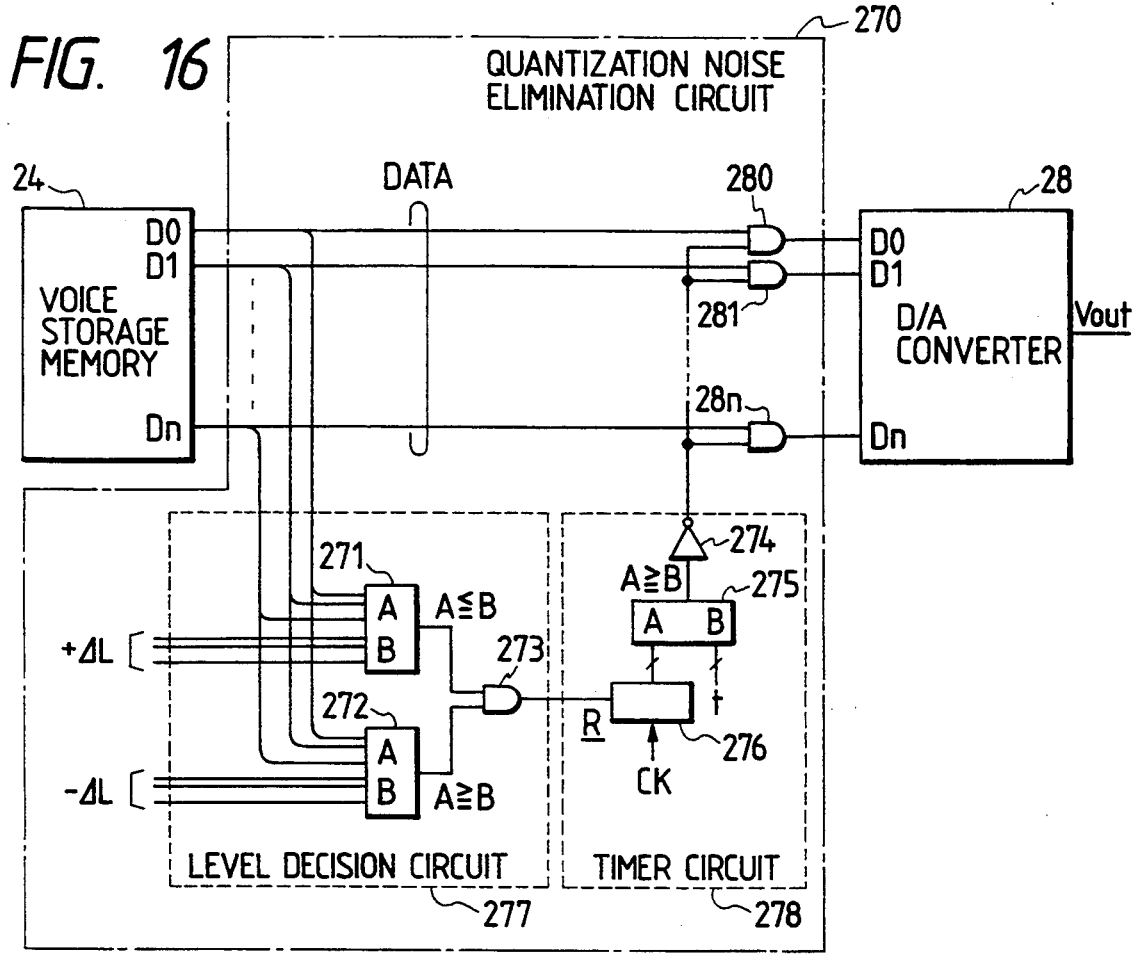
FIG. 16 is a circuit diagram of an example of a quantization noise elimination circuit incorporated in the radio pager according to the invention.

FIG. 16 is a circuit diagram of an example of a quantization noise elimination circuit incorporated in the radio pager 33 according to the invention. When an analog signal is converted to a digital signal, quantization noise (error component) inevitably occurs. The quantization noise is particularly annoying during a voiceless period of communication. In this example, the input side of the D/A converter 28 (see FIG. 2) is provided with a quantization noise elimination circuit 270 which works as follows:

A digital signal retrieved from the voice memory part 6 is input to the D/A converter 28 for conversion to an analog signal Vout. The quantization noise elimination circuit 270 applies to, but not limited by, a setup where the digital signal is composed of a two's compliment code. Bits D0 through Dn constituting the digital signal from the voice memory part 24 are input via AND circuits 280 through 28n to the corresponding input terminals D0 through Dn of the D/A converter 28. After retrieval from the voice memory part 24, the digital signal is checked by a level decision circuit 277 (indicated by broken line in FIG. 16) for voiceless level duration. When judged to be at a voiceless level, the signal is input to a timer circuit 278 (also indicated by broken line in FIG. 16) that checks the signal for the duration of time in which the voiceless level lasts. When the voiceless level is found to exceed a predetermined period of time by the level decision circuit 277 and by the timer circuit 278, a voiceless period is recognized. This sets the output signal passing through a logical NOT circuit 274 to a logical 0, thereby closing the gates of the AND circuits 280 through 28n. That is, irrespective of the digital signal coming from the voice memory part 24, a logical 0 signal from the logical NOT circuit 274 causes the AND circuits 280 through 28n forcibly to set to the logical 0 the input signal made of D0 through Dn input to the D/A converter 28.

As mentioned, the digital signal made of D0 through Dn is composed of a two's compliment code. When the signal is eight bits long, the maximum positive value is "01111111," the maximum negative value "10000000," and the zero level "00000000." A positive 1 in decimal notation is expressed as "00000001" in binary notation; a negative 1 in decimal notation is denoted as "11111111" in binary notation. Thus if the signal is judged to contain a voiceless period, the quantization noise during the voiceless period is eliminated completely by setting fixedly the output of the AND circuits 280 through 28n to 0.

The level decision circuit 277 of FIG. 16 enables the maximum positive value $+\Delta L$, which is regarded as voiceless, and the maximum negative value $-\Delta L$, to be established. If $+1$ is taken as the maximum positive value $+\Delta L$, the binary value "00000001" is input to an input terminal B of a comparator 271; if $-1$ is taken as the maximum negative value $-\Delta L$, the binary value "11111111" is input to an input terminal B of a comparator 272. Input terminals A of the comparators 271 and 272 are supplied with the digital signal from the voice memory part 24. When $A \leq B$, the comparator 271 generates an output signal "1"; when $A \geq B$, the comparator 272 generates the output signal "1". The output signal of the comparator 271 or 272 is output via an AND circuit 273. Thus when the digital signal is "00000001," "00000000" or "11111111," the AND circuit 273 outputs a "1" that indicates the detection of a voiceless period.

In case the digital signal is greater than the maximum positive value $+\Delta L$ (e.g., "00000010"), the output of the comparator 271 is set to 0. If the digital signal is smaller than the maximum negative value $-\Delta L$ (e.g., "11111110"), the output of the comparator 272 is set to 0. This allows the AND circuit 273 to output the "1" signal only when the digital signal is within the range of levels where the signal is regarded as voiceless.

The timer circuit 278 comprises a timer circuit 276 and a comparator 275. A reset input terminal R of the counter circuit 276 is fed with the detection output from the level decision circuit 277. When a voiceless period is detected, the counter circuit 276 is released from its reset state and starts counting clock pulses CK. The count of the counter circuit 276 is sent to an input terminal A of the comparator 275. An input terminal B of the comparator 275 is fed with a time setting t beyond which a voiceless period is recognized. When a voiceless level is found to last longer than the time setting t, the comparator 275 sets its output signal to 1 ($A \geq B$). This output signal is inverted by the logical NOT circuit 274 before being input to the AND circuits 280 through 28n. This sets to the zero level (i.e., "00000000") the digital signal fed to the input of the D/A converter 28 regardless of the digital signal retrieved from the voice memory part 24.

When the level decision circuit 277 is supplied with a digital signal whose level exceeds the $\pm \Delta L$, the comparator 271 or 272 detects that input, sets the output to 0, and resets the counter circuit 276 of the timer circuit 278. This in turn sets the control input of the AND circuits 280 through 28n to 1 via the logical NOT circuit 274, allowing the digital signal retrieved from the voice memory part 24 to enter the D/A converter 28. In this manner, the moment a voiceless period comes to an end, the digital signal read from the voice memory part 24 is converted to an analog signal.

Experiments conducted by the inventor indicate that the time setting t for the timer circuit 278 should preferably be set between 0.5 and 20 ms. This is merely a rule-of-thumb time range that may vary considerably depending on the user's sensitivity. Any one of different voiceless levels may be selected in accordance with the level and resolution of the input signal in question. The digital signal may be something other than the two's compliment code. Where the eight-bit format is adopted, a value "01111111" or "10000000" may be taken as the alternate mid-point level. With this scheme in place, when a voiceless period is detected by the combination of a multiplexer and a gate circuit arrangement, the D/A converter 28 may be supplied not with a digital signal from the voice memory part 24 but with the value "01111111" or "10000000" instead.

Figure 17:
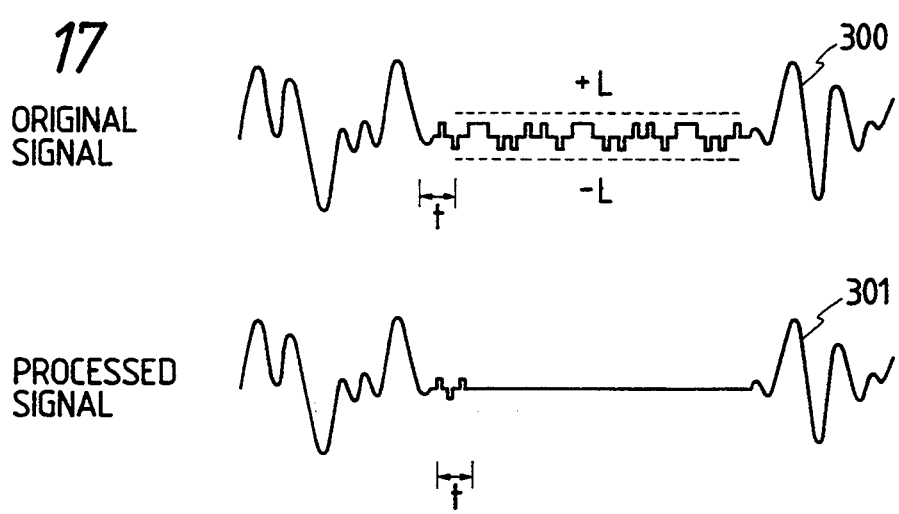
FIG. 17 is a waveform view that serves to explain how the quantization noise elimination circuit of FIG. 16 illustratively operates.

FIG. 17 is a waveform view that serves to explain how the above-described quantization noise elimination circuit illustratively operates. In FIG. 17, a waveform 300 is generated when the digital signal from the voice memory part 24 is input unchanged to the D/A converter 28 and thereby converted to an analog signal. As illustrated, the signal changes in correspondence with the quantization error component during the voiceless period. The signal change emerges as a noise if left unchecked. By contrast, the above-described quantization noise elimination circuit causes the AND circuits 280 through 28n forcibly to convert to an analog signal the digital signal corresponding to the zero signal when the voiceless level has lasted for the predetermined period t, as shown by a waveform 301. The signal output occurs until a voice signal following the noise-free zero level comes in. Since the time setting t is as short as 0.5 to 20 ms as mentioned, the quantization noise output during that period is too transient to be annoying.

The quantization noise elimination circuit 270 of the above example may be used as a digital voice signal processing circuit in an extensive range of devices dealing with digital audio signals such as digital audio tape recorders.

Figure 18:
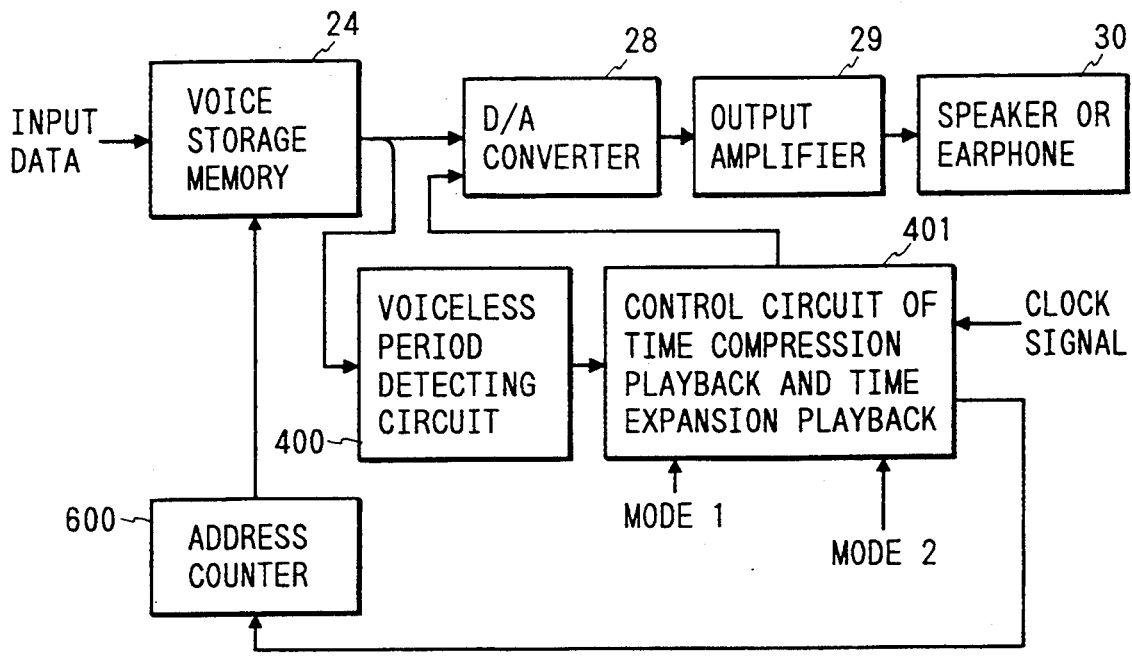
FIG. 18 is a block diagram of a digital voice signal processing circuit allowing the invented radio pager to implement time compression and expansion playback.

FIG. 18 is a block diagram of a digital voice signal processing circuit allowing the invented radio pager to implement time compression and expansion playback at high levels of sound quality. Busy people might want to hear time-compressed messages in order to save time. On the other hand, there is a group of people such as some senior citizens who might want to hear time-expanded messages in order to compensate for the apparent drop in their ability not only to hear clearly but also to comprehend the messages.

Analog type reproducing apparatuses such as conventional cassette tape recorders are capable of time compression and expansion playback by varying the tape playback speed relative to the recording time. One disadvantage of this scheme is that varying the tape speed also alters the pitch (frequency) of the reproduced sound and thereby makes it impossible to maintain acoustic fidelity with respect to the original sound. The result is an extremely garbled reproduction that can barely be understood, if at all.

One solution to the above problem would be to utilize signal processing techniques involving a digital signal processor that changes the playback speed without altering the original sound pitch. This scheme, however, requires a complex device structure that is expensive and consumes large amounts of power. It is unrealistic to equip the paging system with such a sophisticated device structure.

The digital voice signal processing circuit according to the invention takes advantage of voiceless periods contained in voice information. In operation, the voiceless periods are shorted or substantially removed for time compression playback and are prolonged for time expansion playback. This scheme leaves the original sound pitch intact while compressing or expanding the reproduced sound in time, whereby the high fidelity with respect to the original sound is maintained. As will be described later, the scheme is implemented by combining relatively simple logic circuits and without recourse to any complex and expensive equipment such as a digital signal processor. Structured in this way, the digital voice signal processing circuit according to the invention is small-sized and inexpensive.

In the setup of FIG. 18, a digital voice signal retrieved from the voice memory part 24 is input both to the D/A converter 28 and to a voiceless period detection circuit 400. The voiceless period detection circuit 400 may be similar to that utilized in the quantization noise elimination circuit 270 of FIG. 16. If the quantization noise elimination circuit 270 is also incorporated, the voiceless period detection circuit 400 may be shared by both the circuit 270 and by the digital voice signal processing circuit. The output signal of the voiceless period detection circuit 400 is input to a time compression and expansion control circuit 401. The time compression and expansion control circuit 401 designates either time compression or time expansion playback upon receipt of a MODE 1 or MODE 2 control signal. With the mode control signal received, the time compression and expansion control circuit 401 controls the operation of the address counter 600 that generates an address signal by which to read the voice memory part 24. For example, with the MODE 1 control signal designating time compression playback, detection of each voiceless period prompts the voiceless period detection circuit 400 to raise the clock frequency. This makes it possible to read data from the voice memory part 24 more quickly than usual during every voiceless period, whereby the voiceless periods are shortened substantially for time compression playback.

With the MODE 2 control signal designating time expansion playback, detection of each voiceless period prompts the voiceless period detection circuit 400 to lower or stop for a predetermined period the clock frequency. This makes it possible to read data from the voice memory part 24 more slowly than usual during every voiceless period, whereby the voiceless periods are prolonged or expanded substantially for time expansion playback.

Figure 19:
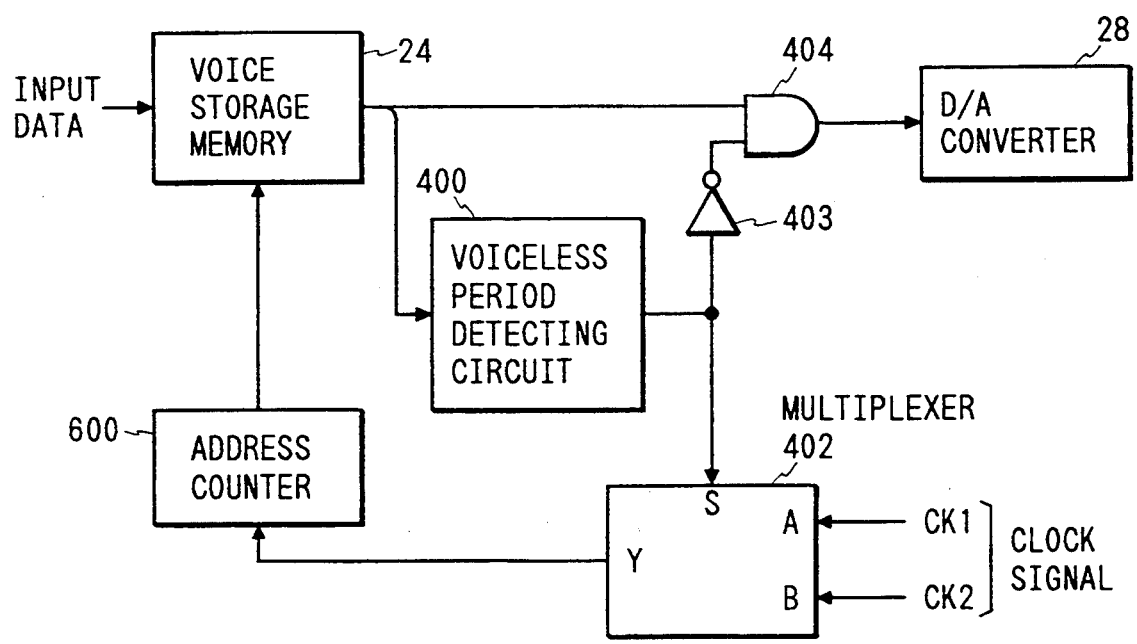
FIG. 19 is a partial block diagram of a radio pager additionally equipped with a time compression playback circuit according to the invention.

FIG. 19 is a partial block diagram of a radio pager additionally equipped with a time compression playback circuit according to the invention. With this radio pager, the output signal of the voiceless period detection circuit 400 is input, on the one hand, to an AND circuit 404 via a logical NOT circuit 403. The AND circuit 404 is a gate circuit that forwards the digital signal from the voice memory part 24 to the D/A converter 28, the gate circuit having the same constitution as that of the quantization noise elimination circuit 270. That is, this type of radio pager realizes two functions concurrently: to carry out time compression playback during voiceless periods, while eliminating the quantization noise from these periods.

The output signal of the voiceless period detection circuit 400 is input, on the other hand, to a control terminal S of a multiplexer 402. In accordance with the output signal of the circuit 400 input to its control terminal S, the multiplexer 402 supplies the address counter 600 selectively with a clock pulse signal CK1 or CK2. The clock pulse signal CK1 corresponds illustratively to normal playback and has the same sampling frequency as that in effect when the paging station performs A/D conversion. The clock pulse signal CK2, corresponding illustratively to time compression playback, has a frequency about 10 to 100 times as high as that of the clock pulse signal CK1.

Suppose that with time compression playback mode designated, the voiceless period detection circuit 400 detects a voiceless period. In that case, the output signal of the circuit 400 is brought High (i.e., set to logical 1). In turn, the output signal of the logical NOT circuit 403 is driven Low (i.e., set to logical 0) to close the gate of the AND circuit 404. Thus where the digital signal is made of a two's compliment code as mentioned earlier, the digital signal that is input to the D/A converter 28 during the voiceless period is set forcibly to the zero level. Where the output signal of the voiceless period detection circuit 400 is driven High, the multiplexer 402 supplies the address counter 600 with the clock signal CK2 instead of the clock signal CK1. This causes the address counter 600 to perform an address updating operation at speeds about 10 to 100 times that of normal playback. As a result, the voiceless period is shortened to 1/10 to 1/100 of the original length, whereby time compression playback is accomplished in a manner equivalent to that of more complex and expensive time compression playback schemes.

According to the inventor's investigations, voiceless periods take up a fairly long portion of all messages stored in and reproduced from automatic answering telephone sets; the voiceless periods occupy between 30 to 50 percent of the total message playback time. Substantially removing these voiceless periods will shorten the playback time to about two-thirds to one half of the original time duration.

When each voiceless period ends, normal playback mode is immediately restored. This keeps the original sound quality intact and makes it very easy to comprehend the reproduced message. If it is desired to stop the time compression playback function in the above circuit constitution. The output signal of the voiceless period detection circuit 400 is input to the control terminal S of the multiplexer via a newly added AND circuit or the like. To keep the time compression playback function inactive, a 0 is input to the added AND circuit. This holds the control terminal S of the multiplexer 402 always at the Low level. The clock signal CK1 is then input to the address counter 600 even during a voiceless period and a voiceless level is output for the duration of the voiceless period. In the setup above, the AND circuit 404 acts as the quantization noise elimination circuit that minimizes generation of the quantization noise during the voiceless period.

Figure 20:
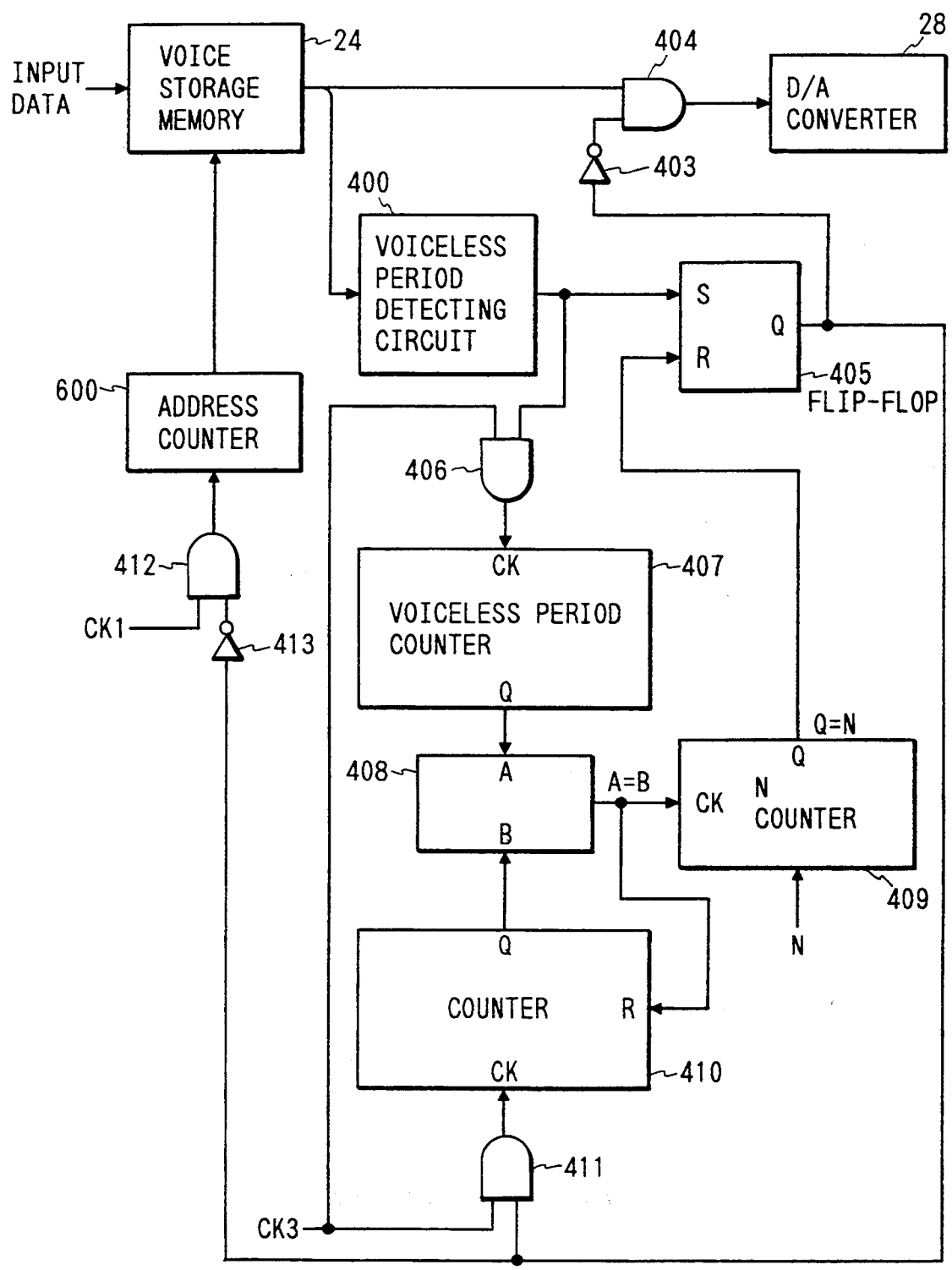
FIG. 20 is a partial block diagram of a radio pager additionally equipped with a time expansion playback circuit according to the invention.

FIG. 20 is a partial block diagram of a radio pager additionally equipped with a time expansion playback circuit according to the invention. This radio pager is designed to generate voiceless periods that are expanded in proportion to the true voiceless periods. In the setup of FIG. 20, the output signal of the voiceless period detection circuit 400 is supplied on the one hand to a set input terminal S of a flip-flop circuit 405 and on the other hand to one of the two input terminals of an AND circuit 406. The other input terminal of the AND circuit 406 is fed with a clock pulse signal CK3 by which to measure voiceless periods. The output signal of the AND circuit 406 is input to a voiceless period counter 407.

The voiceless period counter 407 obtains a voiceless period count by counting the clock pulse signal CK3 during the time that is judged to be voiceless by the voiceless period detection circuit 400. A counter 410 counts the clock pulse signal CK3 that is input via an AND circuit 411. The voiceless period counter 407 acquires the voiceless period count and keeps it at the same time. The counted voiceless period is reproduced by the counter 410 that counted the clock pulse signal CK3 during the voiceless period. The output of the voiceless period counter 407 and that of the counter 410 are input to a comparator 408. A coincidence output (A=B) of the comparator 408 is counted by an N counter 409.

The N counter 409 is a programmable counter that prolongs a voiceless period by a factor of N. The value N may be variable but is not limited thereto. When the count value Q coincides with N, the N counter 409 outputs a coincidence signal Q=N to reset the flip-flop circuit 405. The N counter 409 may alternatively be implemented using a down counter circuit. In this case, the counter value is counted down from the initial value N. When the count reaches 0, a borrow output of the counter resets the flip-flop circuit 405.

On the one hand, an output signal Q of the flip-flop circuit 405 is inverted by the logical NOT circuit 403 for use as a control signal of the AND circuit 404 having the quantization noise elimination function. On the other hand, the output signal Q of the flip-flop circuit 405 is used as a control signal of the AND circuit 411 supplying the clock pulse signal CK3 to the counter 410 and as a control signal of an AND circuit 412 via a logical NOT circuit 413. The AND circuit 412 acts as a gate circuit that supplies selectively the clock pulse signal CK1 to the address counter 600.

In operation, the voiceless period detection circuit 400 first detects a voiceless period. This prompts the AND circuit 406 to open its gate, inputting the clock pulse signal CK3 to the voiceless period counter 407. The voiceless period counter 407 keeps counting the clock pulse signal CK3 while the voiceless period detection circuit 400 continues to recognize the voiceless period. When the voiceless period detection circuit 400 detects the input of a voice digital signal, the circuit 400 sets the flip-flop 405 upon transition from High to Low level of the detected signal. This brings the output signal Q High and supplies the A/D converter 28 with the digital signal corresponding to the voiceless period instead of with the digital signal from the voice memory part 24.

The transition to logical 1 of the output signal Q from the flip-flop circuit 405 sets the output signal of the logical NOT circuit 413 to logical 0, thus closing the gate of the AND circuit 412. This discontinues the supply of the clock pulse signal CK1 to the address counter 600. In turn, the address counter 600 is left with the previous address. In other words, the read operation on the voice memory part 24 is stopped at this point.

The transition to logical 1 of the output signal Q from the flip-flop circuit 405 causes the AND circuit 411 to open its gate. This allows the counter 410 to start counting the clock pulse signal CK3. When the count value of the counter 410 coincides with that of the voiceless period counter 407, the comparator 408 outputs the coincidence signal A=B to activate the N counter 409 and to reset the counter 410. The above operations are repeated until the N counter 409 reaches the value N. With the N value counted, the flip-flop circuit 405 is reset. That is, when the voiceless period measured by the voiceless period counter 407 is multiplied by a factor of N, the flip-flop circuit 405 is reset. Resetting of the flip-flop circuit 405 prompts the AND circuit 412 to open its gate again, which allows the clock pulse signal CK1 to be input to the address counter 600. This effectively resumes the retrieval of digital signals from the voice memory part 24. With the gate of the AND circuit 404 opened to supply the read-out digital signal to the D/A converter 28, the voice signal begins to be output again. In the above setup, the expansion of each voiceless period is in direct proportion to the voiceless period of the applicable original sound. Because breaks within a message are expanded proportionately, it is easier for the user to comprehend the meaning of the message.

When a voiceless period is counted, the quantization noise will be concurrently output if left unchecked. To eliminate the quantization noise during the counting of voiceless periods illustratively requires that the output signal of the voiceless period detection circuit 400 be inverted by a logical NOT circuit for control of the AND circuit 404. In such a case, the AND circuit 404 is a three-input AND circuit. During the counting of a voiceless period, the additional output signal of the voiceless period detection circuit 400 eliminates the quantization noise. During the expanded voiceless period that follows, the output signal Q of the flip-flop circuit 405 removes the quantization noise in the manner described above.

Figure 21:
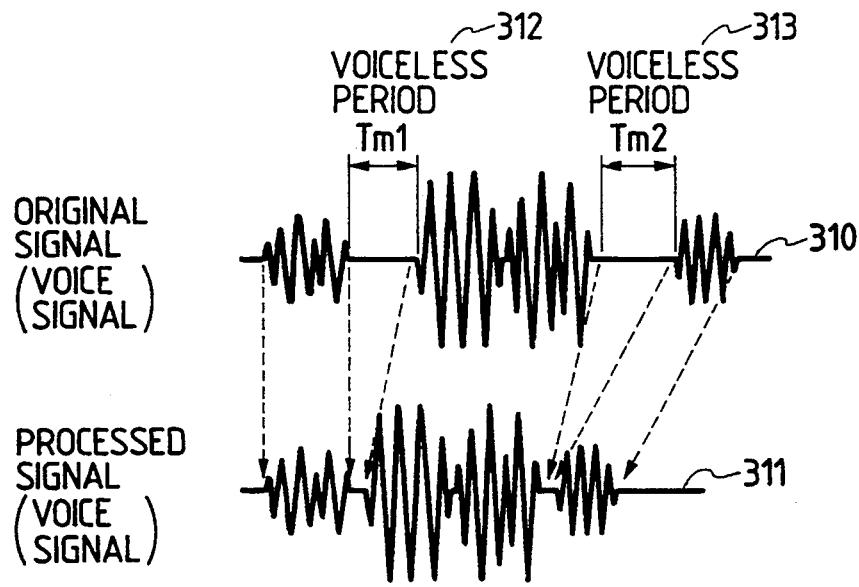
FIG. 21 is a waveform view that serves to explain how the time compression playback circuit of FIG. 19 operates.

FIG. 21 is a waveform view that serves to explain how the time compression playback circuit of FIG. 19 operates. As shown, voiceless periods 312 (Tm1) and 313 (Tm2) of an original signal 310 are eliminated effectively by switching the clock pulses fed to the address counter 600. This implements time compression playback while leaving the pitch (frequency) of the voice signal intact, i.e., without degrading the sound quality of the voice signal.

Figure 22:
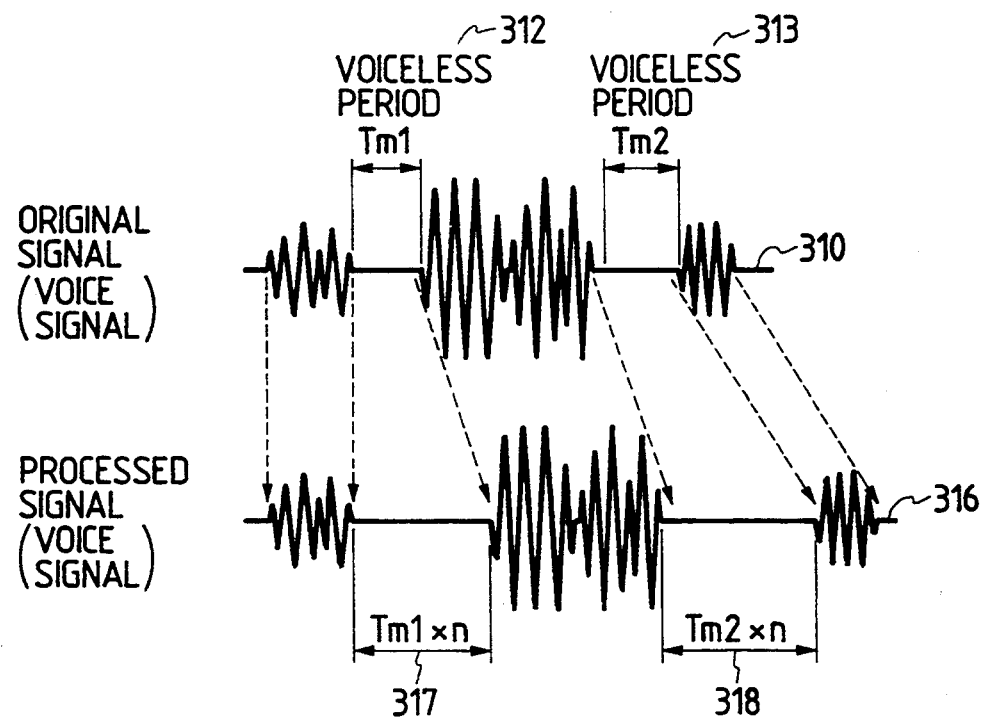
FIG. 22 is a waveform view that serves to explain how the time expansion playback circuit of FIG. 20 operates.

FIG. 22 is a waveform view that serves to explain how the time expansion playback circuit of FIG. 20 operates. As indicated, the voiceless periods 312 (Tm1) and 313 (Tm2) of the original signal 310 are expanded by a factor of N each when the operation of the address counter 600 is stopped during each voiceless period by the counter 410 and by the N counter 409. This implements time expansion playback while leaving the pitch (frequency) of the voice signal intact, i.e., without degrading the sound quality of the voice signal.

Figure 23:
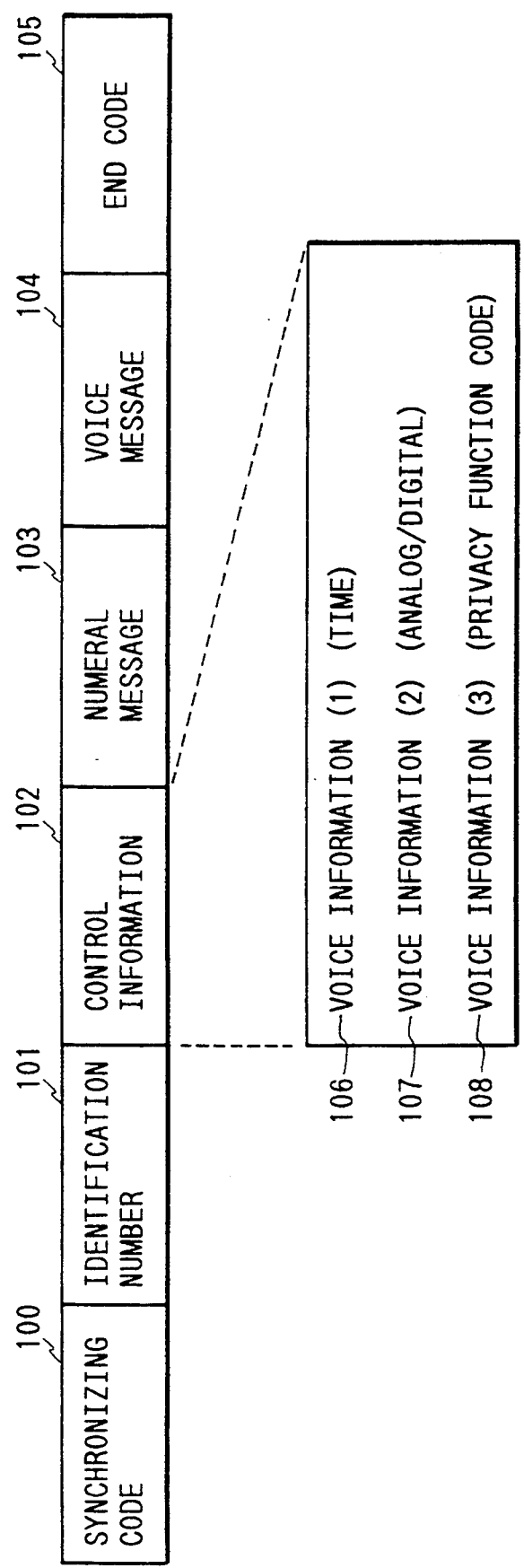
FIG. 23 is a view depicting a typical information format used by the embodiments of the invention.

FIG. 23 is a view depicting a typical information format used by the embodiments of the invention. Normally, every radio pager of the radio paging system embodying the invention first detects a synchronizing code (synchronizing signal) 100 followed by a radio pager identification number 101. When received, the identification number 101 is compared with the identification number assigned to the radio pager. If the two numbers match, the information that follows the identification number becomes effective to the radio pager in question. As illustrated, control information 102 following the identification number 101 comprises voice information (1) 106 indicating a voice message time, voice information (2) 107 indicating whether the format of the transmitted data is analog or digital, and voice information (3) 108 containing a control parameter that designates a private function code needed to cancel the privacy function. The control information 102 is followed by numerical information 103, a voice message 104, and an end code 105 that terminates a single transmission, in that order.

Figure 24:
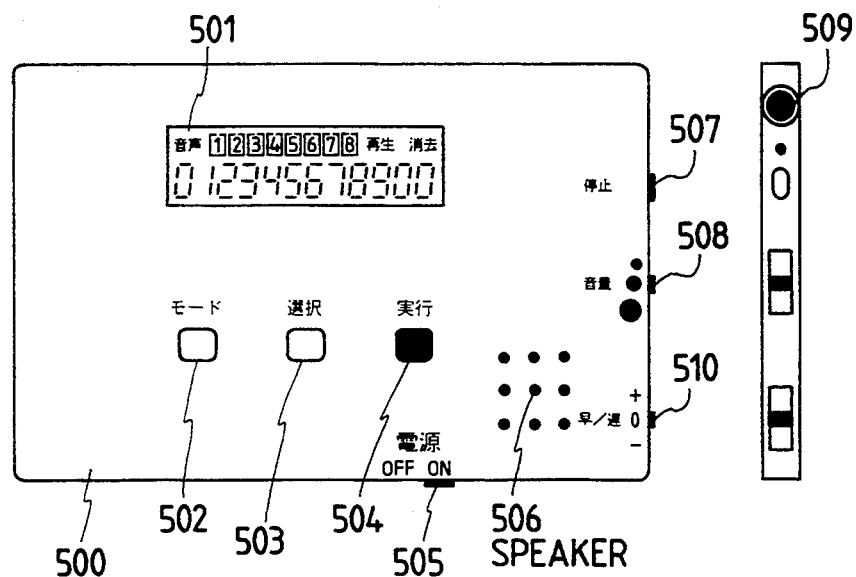
FIG. 24 is a set of a plan and a side view of the typical radio pager according to the invention.
Figure 25:
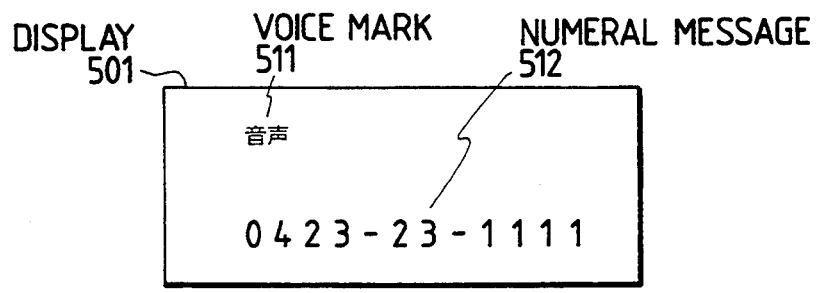
FIGS. 25, 26 and 27 are views illustrating different indications on the display of the radio pager according to the invention.
Figure 26:
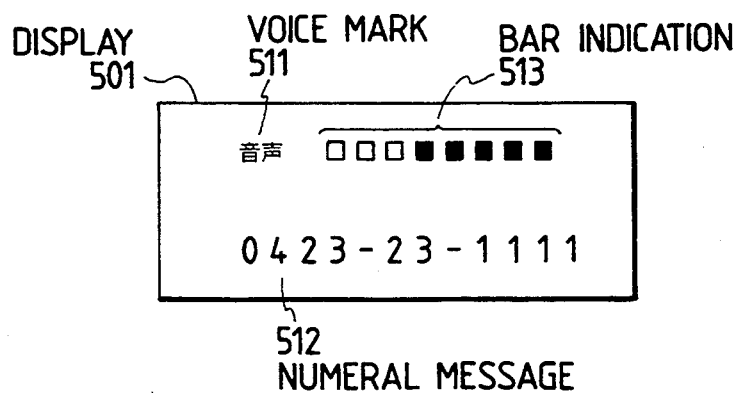
Figure 27:
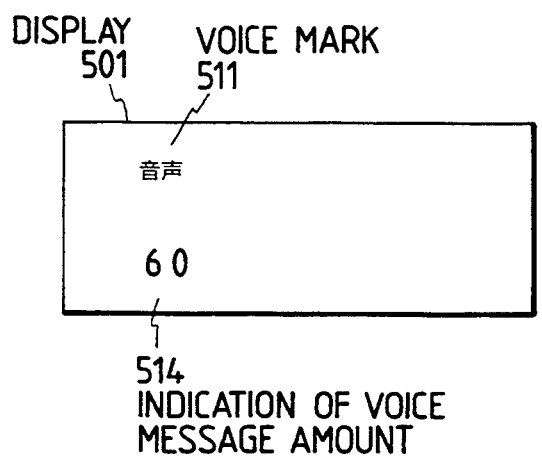

FIG. 24 shows the appearance of the typical radio pager according to the invention. The radio pager is a card type pager that is thin and lightweight. The easy-to-use radio pager is small enough to fit into a shirt pocket. As indicated, a front panel 500 of the radio pager comprises a liquid crystal display (LCD) 501, a "MODE" switch 502 for designating playback or erasure of a message, a "SELECT" switch 503 for selecting any of the received messages, an "EXECUTE" switch 504 for designating the start of playback or erasure of a message, a "POWER" switch 505 for turning on and off power to the radio pager, and a speaker 506 that outputs a paging beep and a reproduced voice message. On a side of the radio pager are a "STOP" switch 507 for stopping a paging beep or flashing light emission, a "VOLUME" switch 508 for changing the volume of the paging beep or reproduced voice, a earphone jack 509 into which to plug an earphone, and a "FAST/SLOW" switch 510 for selecting either time compression playback or time expansion playback. FIGS. 25, 26 and 27 are views illustrating different indications on the LCD 501 of the radio pager according to the invention, the indications pertaining in particular to the amounts of voice information received.

FIG. 25 shows how the LCD 501 illustratively displays a voice mark 511 and a numeral message 512. The voice mark 511 indicates the presence or absence of a voice message. The decision of whether or not to reproduce the voice message is up to the addressee carrying the radio pager. The mark 511 may alternatively be a symbolic or color indication instead of a character indication.

FIG. 26 shows how the LCD 501 illustratively displays a voice mark 511, a numeral message 512 and a voice amount indication 513. The voice amount indication 513 indicates the amount of the transmitted voice information in a bar graph format.

FIG. 27 shows how the LCD 501 illustratively displays a voice mark 511 and a voice amount indication 514. In this case, the voice amount indication 514 indicates the amount of the transmitted voice information in a numeric format.

Figure 28:
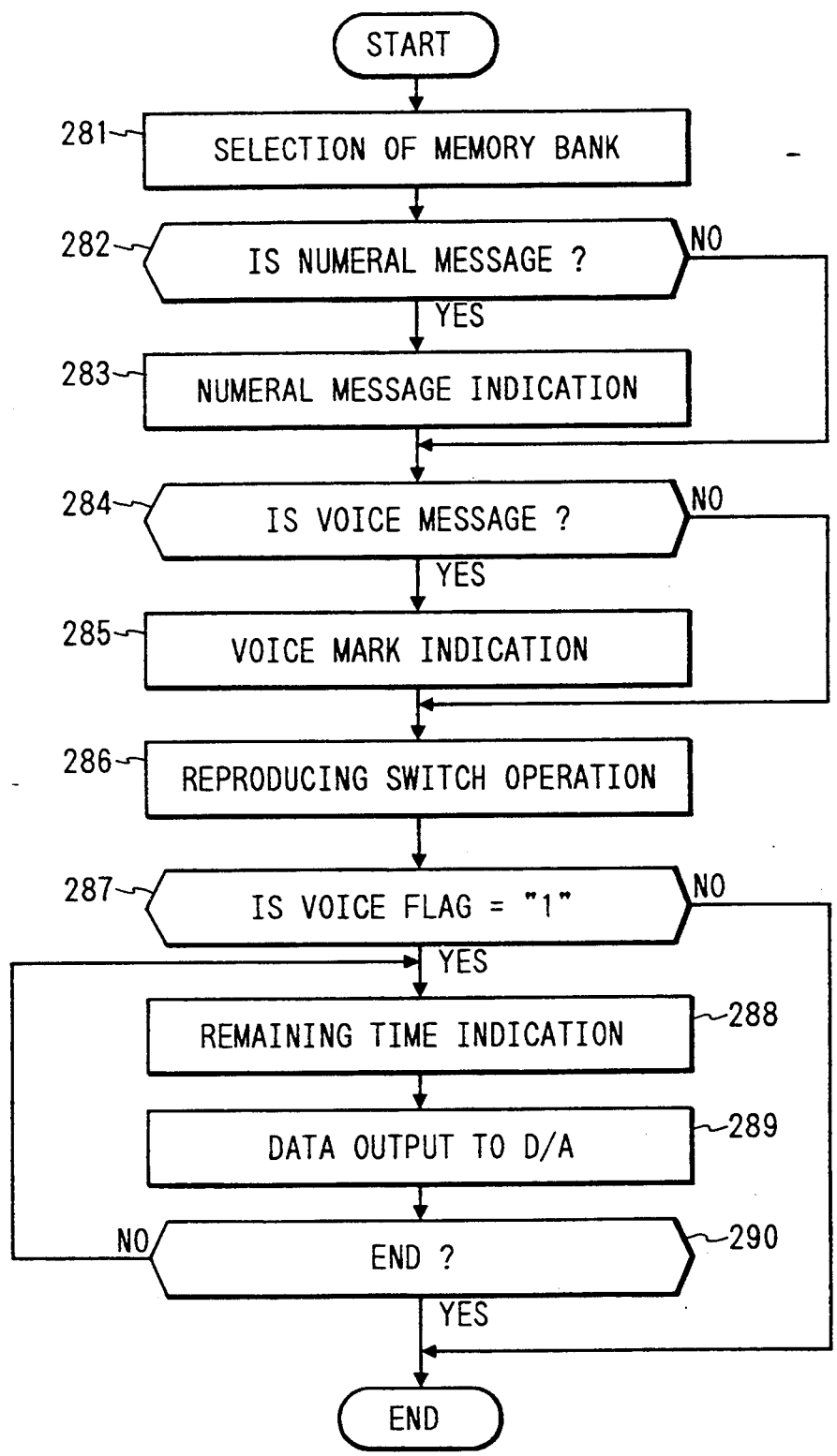
FIG. 28 is a flowchart of information reproduction steps taken by the typical radio pager according to the invention.

FIG. 28 is a flowchart of information reproduction steps taken by the typical radio pager according to the invention. With this radio pager, a plurality of messages may be stored in the voice memory part 24. Initially, the user operates the "SELECT" switch 503 to select the memory bank from which to reproduce the desired message (step 281). If the selected memory bank contains a numeric message, that message is displayed on the LCD 501 (steps 282, 283). If the selected memory bank contains voice information, the LCD 501 displays a character or symbolic voice mark 511 indicating the presence of voice information in the memory (steps 284, 285). When the addressee performs a playback switch operation (step 286), a check is made on the voice flag (step 287). The check reveals, when the voice information exists, the amount thereof in a bar graph or numeric format on the LCD 501 and initiates voice message playback (steps 288, 289, 290). The amount of voice information is displayed in the form of the remaining time. The display is updated at regular intervals. If no voice information is present, message playback will not be executed even if attempted.

Figure 29A:
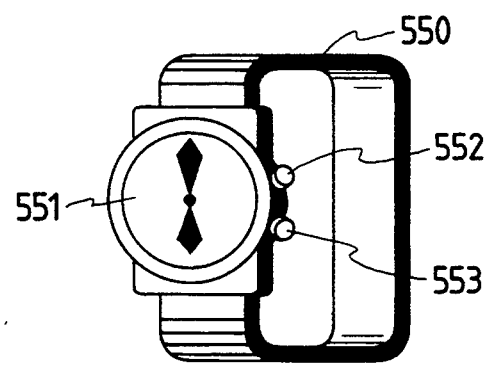
FIGS. 29A and 29B are views showing the appearance of another example of the radio pager according to the invention.
Figure 29B:
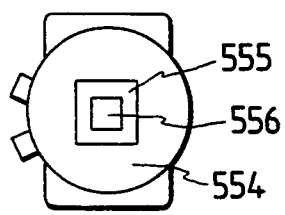

FIGS. 29A and 29B are views showing the appearance of another example of the radio pager according to the invention, the two figures showing a face side and a back side of the device, respectively. This radio pager doubles primarily as a wristwatch whose watchband 550 acts as an antenna. A face plate 551 is made of a transparent piezoelectric device (PZT) that also functions as a flat speaker. A switch 552 is a start/stop button which, when operated, stops a paging beep or skin stimulation (to be described below) or starts reproducing a message. A switch 553 is an operation button for watch adjusting purposes. Although this radio pager has two multi-function buttons, other examples embodying the radio pager according to the invention may have one or a plurality of control buttons. A metal case 554 is an electrode serving as ground, paired with the other electrode 556 that is insulated from the case 554. When the radio pager receives a call or message addressed thereto, a low voltage not harmful to the human body is applied across one electrode 554 to the other 556. The resulting small current notifies the user of the incoming call or message by stimulating the user's skin. This feature is useful when a beep sound cannot be used in such situations as a conference. The beep sound emission is inhibited by pushing the switch 552 to select silent mode. Where the metal case is not usable, another electrode paired with the electrode 556 may be installed. The alternative electrode arrangement offers the exactly same feature as described above.

The radio pager according to the invention may alternatively be incorporated in necklaces, brooches and other personal ornaments in addition to the card or wristwatch format. Furthermore, the radio pager may be contained in a wide range of devices: memory cards, headphone stereo equipment, card type radios, portable TV sets, electronic cameras, video cameras, electronic notebooks, portable computers, portable word processors and portable telephone sets.

It is to be understood that while the invention has been described in conjunction with specific embodiments, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

What is claimed is:

1. A radio pager comprising demodulation part for demodulating a radio signal which is transmitted over a radio network and which contains voice information and other information; an analog-to-digital converter for digitizing said voice information taken from the demodulated radio signal if said voice information is found to be analog format following the demodulation; memory means for storing the digitized voice information; a digital-to-analog converter for converting said digitized voice information in said memory means to an analog signal; informing means for informing a user carrying said radio pager of the memory presence of said voice information in said memory means including means for displaying the amount of said voice information stored in said memory means; and output means for reproducing and outputting said voice information held in said memory means as an audible signal based on said analog signal in response to an output designating operation by said user.

2. A radio pager according to claim 1, wherein said informing means includes means for displaying the type of the information received by said radio pager.

3. A radio pager according to claim 1, wherein said informing means includes means for displaying the type of the information received, and said output means includes means for designating the type of the information to be reproduced and output.

4. A radio pager according to claim 1, wherein said output means includes means for detecting a voiceless period of a digital voice signal as well as means for forcibly setting to an alternate zero level said digital voice signal to be input to said digital-to-analog converter during said voiceless period.

5. A radio pager according to claim 4, wherein said voiceless period is detected on the basis of outputs from a pair of comparators comparing two digital signals in magnitude, one digital signal being one to be reproduced, the other digital signal being one which corresponds to any of adjustable positive and negative levels each regarded as voiceless for a predetermined period of time in said digital voice signal.

6. A radio pager according to claim 1, wherein said output means includes means for detecting voiceless periods of said digitized voice information as well as time expansion means for expanding said voiceless periods for time expansion playback.

7. A radio pager according to claim 1, wherein said output means includes means for detecting voiceless periods of said digitized voice information as well as time compression means for compressing said voiceless periods for time compression playback.

8. A radio pager according to claim 7, wherein said time compression means is implemented by performing an address updating operation of said memory means faster than usual.

9. A radio pager according to claim 1, said radio pager being incorporated in a card size case.

10. A radio pager according to claim 1, said radio pager being incorporated in the case of a wristwatch.

11. A radio pager according to claim 10, wherein the watchband of said wristwatch doubles as an antenna.

12. A radio pager according to claim 10, wherein the face plate of said wristwatch contains a piezoelectric device acting as a flat speaker outputting reproduced voice messages.

13. A radio pager according to claim 10, wherein the back side of said wristwatch has a plurality of electrodes producing a low voltage not harmful to the human body, said low voltage causing a small current to flow in order to stimulate the skin of a user wearing said wristwatch, thereby informing said user of the receipt of a message.

14. A radio pager according to claim 6, said radio pager being incorporated in a card size case together with a small speaker.

15. A radio pager according to claim 1, further comprising means for varying the volume of any one of a paging beep and a voice message.

16. A radio pager according to claim 1, wherein said memory means has addresses corresponding to a plurality of messages and includes a data memory circuit accessed by use of said addresses.

17. A radio pager according to claim 1, wherein said memory means is constituted by a semiconductor memory device.

18. A radio pager according to claim 1, further comprising a circuit for eliminating quantization noise which is generated when voice information is digitized.

* * * * *